(12) United States Patent
Tanimoto

(10) Patent No.: US 7,206,088 B2
(45) Date of Patent: Apr. 17, 2007

(54) RELAY SERVER, COMMUNICATION SYSTEM AND FACSIMILE SYSTEM

(75) Inventor: Yoshifumi Tanimoto, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 896 days.

(21) Appl. No.: 10/045,897

(22) Filed: Jan. 10, 2002

(65) Prior Publication Data

US 2002/0118398 A1 Aug. 29, 2002

(30) Foreign Application Priority Data

Jan. 15, 2001 (JP) .............................. 2001-007072
Jan. 16, 2001 (JP) .............................. 2001-007656
Jan. 16, 2001 (JP) .............................. 2001-007876

(51) Int. Cl.
*G06F 15/00* (2006.01)
*G06F 15/16* (2006.01)
*H04N 1/00* (2006.01)
(52) U.S. Cl. ....................... 358/1.15; 358/407; 709/227
(58) Field of Classification Search ............... 358/1.15, 358/402–407, 3.16; 709/203, 217–219, 227–229
See application file for complete search history.

(56) References Cited

U.S. PATENT DOCUMENTS

| | | | |
|---|---|---|---|
| 5,884,312 | A | 3/1999 | Dustan et al. |
| 6,061,796 | A | 5/2000 | Chen et al. |
| 6,078,583 | A | 6/2000 | Takahara et al. |
| 6,145,084 | A | 11/2000 | Zuili et al. |
| 6,173,334 | B1 | 1/2001 | Matsuzaki et al. |
| 6,215,877 | B1 | 4/2001 | Matsumoto |
| 6,222,536 | B1 | 4/2001 | Kihl et al. |
| 6,226,692 | B1 | 5/2001 | Miloushev et al. |

(Continued)

FOREIGN PATENT DOCUMENTS

JP 56-025880 3/1981

(Continued)

OTHER PUBLICATIONS

"Mac Fan Internet", vol. 4, No. 6, Jun. 1999, p. 33.

(Continued)

*Primary Examiner*—Kimberly Williams
*Assistant Examiner*—Charlotte M. Baker
(74) *Attorney, Agent, or Firm*—Hogan & Hartson LLP

(57) ABSTRACT

A communication system capable of carrying out communication between terminals within different local systems via a plurality of relay servers. The first terminal is connected to the relay server, and the communication with the first relay server is made practicable. In the same manner, the second terminal is connected to the second relay server, and the communication with the second relay server is made practicable. When a connection demand with the second terminal is transmitted to the first relay server from the first terminal, the first relay server forwards the connection demand to the second relay server, and the second relay server notifies the connection demand to the second terminal, and the communication between the terminals is made practicable. Then, when the data is transmitted from the first terminal to the second terminal, the data is forwarded to the second terminal through the first and second relay servers. Accordingly, the communication can be carried out between the terminals within the local systems connected to different relay servers.

21 Claims, 11 Drawing Sheets

U.S. PATENT DOCUMENTS

| | | | |
|---|---|---|---|
| 6,237,023 B1 | 5/2001 | Yoshimoto | |
| 6,298,239 B1 | 10/2001 | Yonemoto et al. | |
| 6,336,141 B1 | 1/2002 | Fujiyama et al. | |
| 6,538,773 B1 * | 3/2003 | Brossman et al. | 358/3.16 |
| 6,546,488 B2 | 4/2003 | Dillon et al. | |
| 6,564,256 B1 * | 5/2003 | Tanaka | 709/219 |
| 6,594,246 B1 | 7/2003 | Jorgensen | |
| 6,636,513 B1 | 10/2003 | Nishikawa et al. | |
| 6,748,446 B2 | 6/2004 | Sato et al. | |
| 6,757,365 B1 | 6/2004 | Bogard | |
| 6,766,373 B1 | 7/2004 | Beadle et al. | |
| 6,801,341 B1 * | 10/2004 | Joffe et al. | 358/407 |
| 6,889,256 B1 * | 5/2005 | Palevich et al. | 709/229 |
| 2002/0023143 A1 | 2/2002 | Stephenson et al. | |
| 2002/0059489 A1 | 5/2002 | Davis et al. | |
| 2002/0073182 A1 | 6/2002 | Zakurdaev et al. | |
| 2002/0152299 A1 | 10/2002 | Traversat et al. | |

FOREIGN PATENT DOCUMENTS

| | | |
|---|---|---|
| JP | 61-225957 | 10/1986 |
| JP | 09-214486 | 8/1997 |
| JP | 10-126440 | 5/1998 |
| JP | 10-177548 | 6/1998 |
| JP | 11-234270 | 8/1999 |
| JP | 11-313059 | 11/1999 |
| JP | 2000-115167 | 4/2000 |
| JP | 2001-014254 | 1/2001 |
| JP | 2001-027978 | 1/2001 |
| JP | 2001-184289 | 7/2001 |
| JP | 2002-141952 | 5/2002 |
| JP | 2002-217938 | 8/2002 |
| JP | 2002-217942 | 8/2002 |
| JP | 2002-217943 | 8/2002 |
| JP | 2002-300159 | 10/2002 |
| WO | 2000/69140 | 11/2000 |

OTHER PUBLICATIONS

Masuda, et al., "Multicast Network Control for Streaming Data Broadcasting", NTT Network Service Systems Laboratories, Japan, Technical Report of IEICE, SSE2000-280, IN2000-236 (Mar. 2001), pp. 327-334.

* cited by examiner

| SERVER NAME | IP ADDRESS | LAST RENEWAL DATE AND TIME | |
|---|---|---|---|
| server4.xyz.com | 200.1.30.12 | 2000/1/1 12:35:00 | |
| USER ID | TYPE | ATTRIBUTION | CONDITION |
| a b c | USER | — | logoff |
| d e f | FAX | FILE TX/RX | logoff |

FIG. 2

| SERVER NAME | IP ADDRESS | LAST RENEWAL DATE AND TIME | |
|---|---|---|---|
| server4. xyz. com | 200. 1. 30. 12 | 2000 / 1 / 1  12 : 35 : 00 | |
| USER ID | TYPE | ATTRIBUTION | CONDITION |
| a b c | USER | — | logout |
| d e f | FAX | FILE TX / RX | login |

FIG. 5(A)

```
server1. xyz. com
CONNECTION INFORMATION server2. xyz. com
CONNECTION INFORMATION server3. xyz. com
CONNECTION INFORMATION server4. xyz. com
CONNECTION INFORMATION

⋮ serverN. xyz. com
CONNECTION INFORMATION
```

FIG. 5(B)

RELAY SERVER, COMMUNICATION SYSTEM AND FACSIMILE SYSTEM

CROSS REFERENCES TO RELATED APPLICATIONS

This application claims priority of Japanese Patent Application Nos.2001-007072, 2001-007656, 2001-007876 filed in JPO on Jan. 15, 2001, Jan. 16, 2001, Jan. 16, 2001, respectively, the entire disclosures of which are incorporated herein by reference.

BACKGROUND OF THE INVENTION

1. Field of the Invention

The present invention relates to a communication system wherein a plurality of network devices and a plurality of relay servers are connected by a network, and the relay server preferable to be used in such communication system.

2. Description of the Related Art

FIG. 11 is a view useful for explaining an example of a system wherein a general Internet is used. In the figure, the reference numbers 1, 2 are local systems, 3 is Internet, 11, 12, 21, 22 are terminals, 13, 23 are gateways, and 14, 24 are LAN. The local system 1 is constructed by the terminal 11, the terminal 12, the gateway 13 or the like being connected by the LAN 14. The gateway 13 is connected to the Internet 3 along with the LAN 14, and one can use the Internet from various network apparatus such as the terminal 11, the terminal 12 or the like on the LAN 14. Moreover, the local system 2 is also constructed in the same manner such that it is constructed by the terminal 21, the terminal 22, the gateway 23 or the like being connected by the LAN 24. The gateway 23 is connected to the Internet 3 along with the LAN 24, and one can use the Internet from various network apparatus such as the terminal 21, the terminal 22 or the like on the LAN 24. Moreover, in each of the local system 1 and the local system 2, other various apparatuses can be connected by the LAN 14 and the LAN 24.

In such a system, generally, one or a plurality of global IP addresses are assigned to the local system 1 and the local system 2, but the global IP address is not necessarily assigned to each of the network apparatuses within the local system 1 and the local system 2. A private IP address is assigned to each network apparatus within each of the local system 1 and the local system 2, and the private IP address is converted into the global IP address by using functions such as NAT or IP masquerade by the gateway 13 and the gateway 23. By using the gateway 13 and the gateway 23 including such an IP address converting function, for example in the local system 1, the terminal 11 and the terminal 12 are to use the Internet 3 via the gateway 13. Moreover, in the local system 2, the terminal 21 and the terminal 22 are to use the Internet 3 via the gateway 23.

Moreover, the gateway 13, the gateway 23 or other network devices or the like is provided with a function such as a fire wall or a proxy server, and a structure in which the respective terminals use the Internet 3 via these devices is used, and the safety in the system is improved.

For example, when one attempts to access the terminal 11 within the local system 1 from the Internet 3, the global IP address of the gateway 13 can be learned, but the private IP address of the terminal 11 cannot be learned. Therefore, in the general connecting method, the terminal 11 cannot be accessed from outside the local system 1. Moreover, there are cases in which by the function of the fire wall of the gateway 13 for example, the site for accepting the access is limited. Further, it is to be the same manner in the terminal 12, and also in the terminal 21 and the terminal 22 within the local system 2.

Furthermore, the terminal 11 or the terminal 12 within the local system 1, or the terminal 21 or the terminal 22 within the local system 2 is generally provided only with a client function, and is not provided with a function of a server for receiving information from a different network apparatus. Therefore, unless accessing from the terminals 11, 12, 21, 22, to the different network apparatus, the information cannot be transmitted to these terminals from the different network apparatus.

SUMMARY OF THE INVENTION

The present invention was made in consideration to the aforementioned circumstance, and it is thus an advantage of the present invention to provide a communication system capable of connecting to the terminal within the local system from the Internet, or connecting to the terminals within different local systems via a plurality of relay servers, and a relay server preferable to be used in such a communication system.

According to one aspect of the present invention, there is provide a relay server comprising communicating means which is capable of communicating with a plurality of network devices and other relay servers, and connection information holding means for holding the connection information of the network device which is capable of communicating by the communicating means. The communicating means refers to the connection information based on the connection demand from the network device and relays communication with other network devices via other relay servers according to necessity. In such a manner, the network device is connected capable of communicating to the relay server, and as a result, the communication can be carried out to the network device within the local system. Furthermore, even when the network device is connected to a different relay server, by relaying between the relay servers, the communication can be carried out between the network devices which are connected to different relay servers.

Preferably, the relay server to which the different network device of the communication whose connection is demanded from the network device is connected can be constructed to be specified when demanding a connection, or by being set in advance in each of the relay servers, and the communicating means may receive the connection information of other relay servers from outside to store it into the connection information holding means. By receiving the connection information from the outside, management can be carried out in accordance with the situation.

According to another aspect of the present invention, there is provided a communication system wherein a plurality of network devices and a plurality of relay servers are connected by a network. In this communication system, the network device establishes a communication path with any one of the relay servers and carries out communication by demanding a connection with a different network device, and the relay server relays the communication with the different network device via another relay server when necessary based on the connection demand from the network device. In such a communication system, since the communication path is established by any one of the relay servers and the network device, the communication can be carried out between the relay server and the network device. By carrying out the communication between the relay servers by using this and relaying the communication between the network devices, the communication can be carried out between the network devices which are connected to different relay servers.

Preferably, the relay server to which the different network device of the communication destination whose connection is demanded from the network device is connected can be constructed in that it can be specified when demanding the connection or by being set in each of the relay server in advance, and by obtaining the connection information of other relay servers, it is possible to decide which relay server is used to relay the communication. By the relay server obtaining the connection information of other relay servers, management based on the situation becomes practicable.

According to another aspect of the present invention, there is provided a relay server comprising communicating means which is capable of communicating with a plurality of network devices and other relay servers, and connection information holding means for holding the connection information of the network device capable of communicating. The communicating means renews the connection information based on the demand from the network device, and based on the renewal of the connection information, notifies to other relay servers. Moreover, the communicating means renews the connection information within the connection information holding means on the basis of the notification from other relay servers.

According to another aspect of the present invention, there is provide a communication system wherein a plurality of network devices and a plurality of relay servers are connected by a network. In this communication system, the network device establishes a communication path with any one of the relay servers, and carries out the communication by demanding the connection to a different network device. Moreover, the relay server holds the connection information of the network devices capable of communicating and based on the demand from the network device, renews the connection information and notifies it to other relay servers, and also based on the notification being sent from other relay servers renews the connection information.

In such a manner, when the connection information of the network devices connected to each of the relay servers is renewed, such fact is notified to other relay servers, and by receiving the renewal notification of the connection information, the connection information of the network devices is always renewed and can be shared. Therefore, even when demanding a connection to a different network device from the network device, the relay server is capable of confirming which relay server the network device of the destination is connected to, and the communication can be relayed promptly. Moreover, in the network device side, it is not necessary to know which relay server the network device of the destination is connected to, and the connection demand can be carried out easily. Furthermore, since the connection information of the network device which is connected to a different relay server is accumulated in the relay server, by constructing so that these connection information can be referred from the network device, for example, the condition of the destination can be confirmed before demanding a connection.

The notification when renewing the connection information can be carried out to all other relay servers by the relay server which carried out the renewal, and apart from this the relay server can be preferably constructed to relay such notification. In such a case, when receiving the notification, the relay server can be constructed to forward the notification to relay servers other than the relay server which transmitted the notification, and in the case where the received notification is of the past, older than the notification received till then, the notification is destroyed without renewing the connection information. Accordingly, the loop of the communication can be prevented and the notification can be spread out.

According to another aspect of the present invention, there is provided a data base server is provided for holding the connection information of the network device and providing the connection information to the relay server in the communication system where a plurality of network devices and a plurality of relay servers are connected by the network. In this case, the network device establishes the communication path with any one of the relay servers and carries out the communication by demanding a connection with a different network device. Moreover, when renewing the connection information based on the demand from the network device, the relay server causes the data base server to hold the renewed connection information.

As in the manner stated above, the data base server preferably holds the connection information of the network device which is connected to each of the relay servers, and the connection information is provided to the relay server. Then, when the connection information is renewed, the renewed connection information is uploaded to the data base server. As a result, the newest connection information is to be held at all times and be provided. Therefore, when demanding the connection to a different network device from the network device, by obtaining the connection information from the data base server, the relay server is capable of knowing which relay server the network device of the destination is connected to or condition of the network device of the destination. When the communication can be carried out, the communication can be relayed promptly. Moreover, in the network device side, it is not necessary to consider which relay server the network device of the destination is connected is, and the connection demand can be carried out easily. Furthermore, by constructing so that the connection information is obtained from the data base server and to be referable from the network device, for example, the condition of the destination can be confirmed before demanding the connection to the network device.

BRIEF DESCRIPTION OF THE DRAWINGS

FIG. 2 is a view useful for explaining an example of the information including connection information being held by a connection information holding unit shown in FIG. 1;

FIGS. 5(A) and 5(B) are diagrams useful for explaining an example of the information including connection information being held by a connection information holding unit shown in FIG. 4;

DETAILED DESCRIPTION OF THE INVENTION

Figure 1:
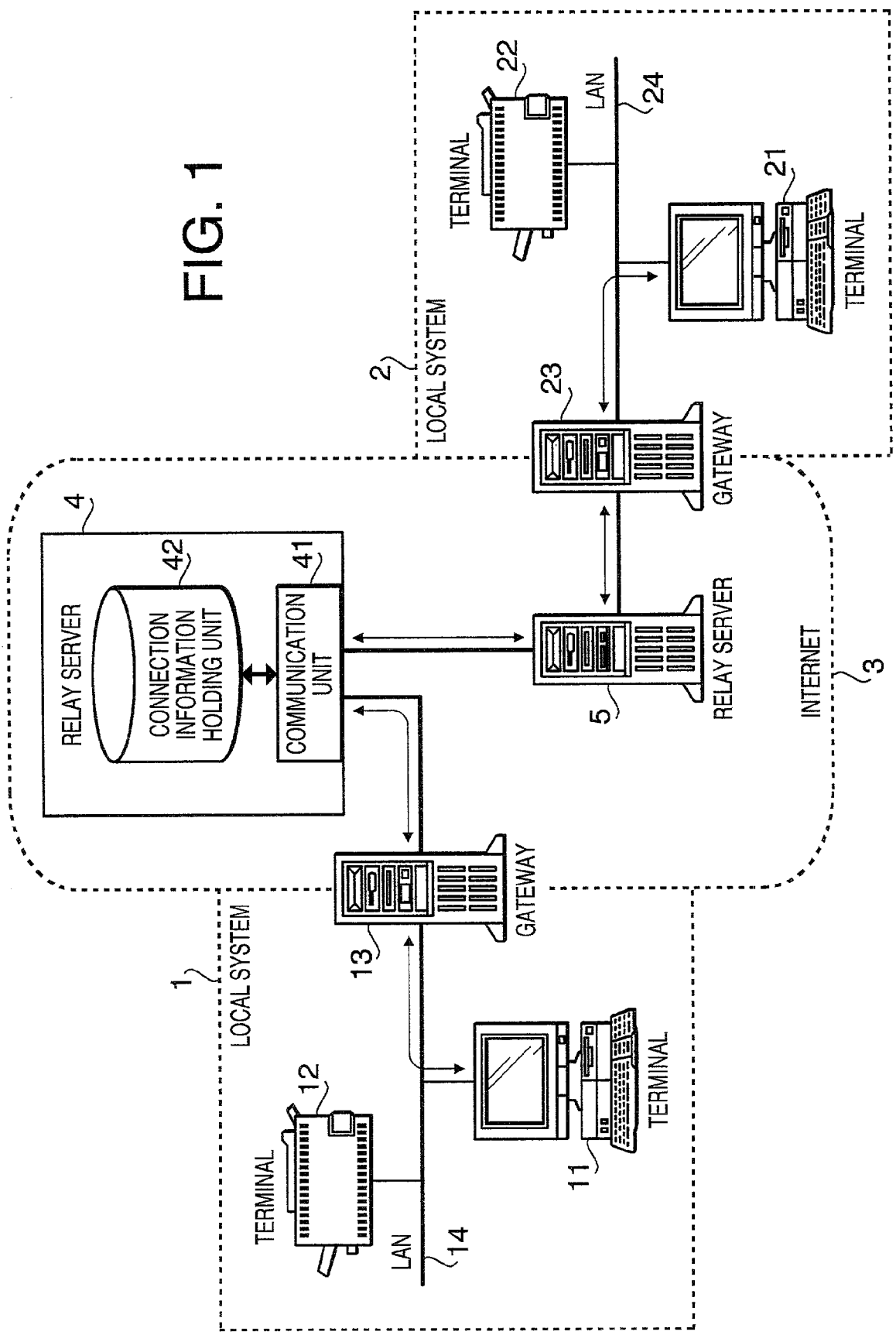
FIG. 1 is a block diagram showing a communication system including a relay server according to a first embodiment of the present invention.
Figure 11:
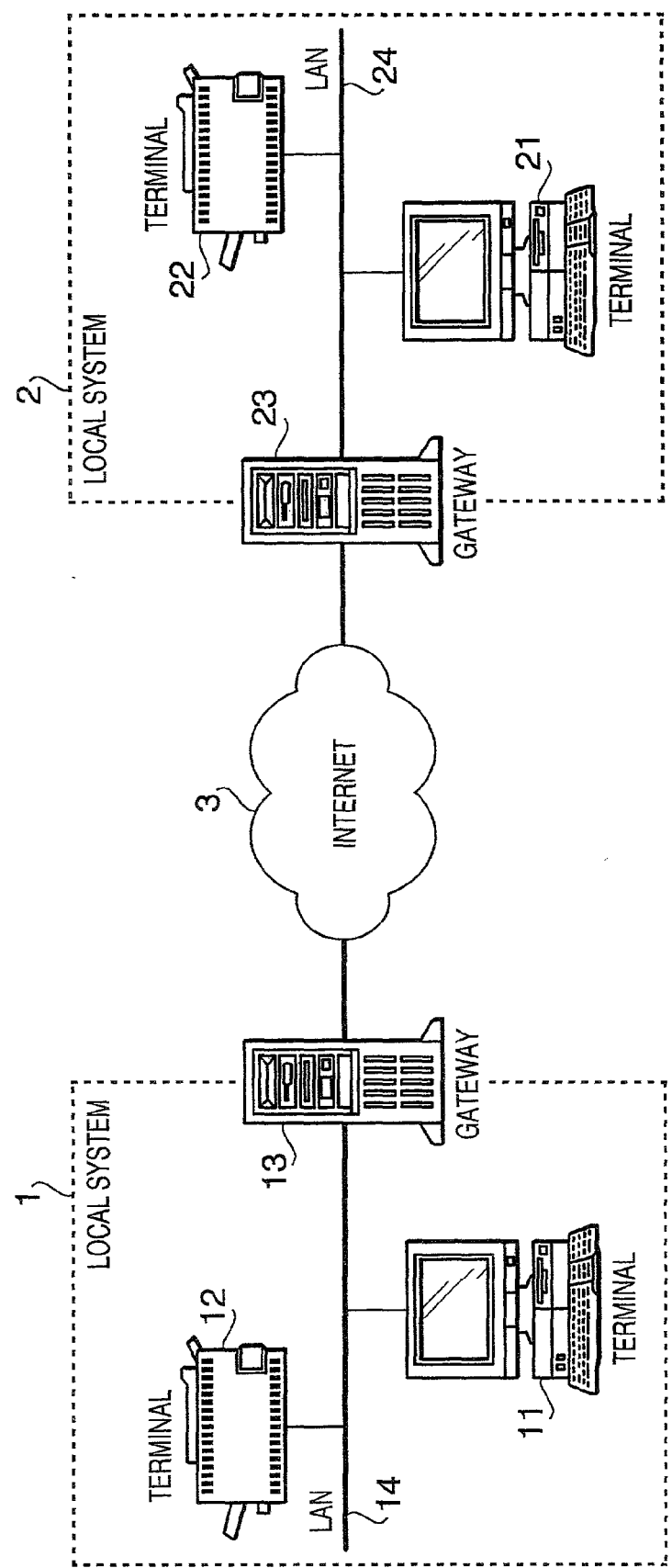
FIG. 11 is a view useful for explaining an example of a system wherein a general Internet is used.

In FIG. 1, for the same part as that of FIG. 11, the same reference number is to be applied and the repetitive description will be abbreviated. The reference numbers 4 and 5 are relay servers, 41 is a communication unit, and 42 is a connection information holding unit. The relay server 4 and the relay server 5 are connected to the Internet 3, and include global IP addresses respectively. By accepting a login demand to the global IP address from the network apparatus, the connection with the network apparatus is maintained and the communication path is maintained. Moreover, it is to be assumed that the communication path is secured between the relay server 4 and the relay server 5. The network apparatus can be connected to any relay server. In the example shown in FIG. 1, a communication path is secured from the terminal 11 and the terminal 12 within the local system 1 to the relay server 4 via the gateway 13, and also from the terminal 21 and the terminal 22 within the local system 2 to the relay server 5. Further, the relay server 4 and the relay server 5 are capable of maintaining the connection with a plurality of network apparatuses.

The relay server 4 and the relay server 5 carry out the communication by relaying the data from the Internet or from the network apparatus of a different local system, by using the communication path to such a network apparatus. Moreover, when receiving a connection demand to a different network apparatus from the network apparatus, when the destination is securing the communication path to the relay server, the data between the two is relayed by using the communication path and the communication is carried out. In the case where the destination is connected capable of communicating with the other relay server, the data is relayed between the network apparatus which demanded the connection and the other relay server, and at the other relay server of which data is forwarded, the data is relayed to the network apparatus of the destination, and the communication between the network apparatuses is realized.

For example, although the connection can be made from the relay server 4 to the gateway 13 within the local system 1, the connection cannot be made to the terminal 11 or the terminal 12. However, by using the global IP address of the relay server 4, the connection can be made to the relay server 4 via the gateway 13 from the terminal 11 or the terminal 12. Therefore, by demanding login to the relay server 4 from the terminal 11 or the terminal 12, the communication can be carried out in both directions between the relay server 4 and the terminal 11 or the terminal 12, which demanded the login. In the same manner, although the connection can be made from the relay server 5 to the gateway 23 within the local system 2, the connection cannot be made to the terminal 21 or the terminal 22. However, by using the global IP address of the relay server 5, the connection can be made to the relay server 5 via the gateway 23 from the terminal 21 or the terminal 22. Therefore, by demanding login from the terminal 21 or the terminal 22 to the relay server 4, the communication can be carried out in both directions between the relay server 5 and the terminal 21 or the terminal 22, which demanded the login. Furthermore, when the relay server 4 and the relay server 5 carry out the communication, the terminal 11 or the terminal 12, and the terminal 21 or the terminal 22 are capable of carrying out the communication via the relay server 4 and the relay server 5.

The relay server 4 can be constructed by including such as the communication unit 41 and the connection information holding unit 42. The communication unit 41 is capable of communicating with a plurality of network apparatuses and one or more of relay server via the Internet 3. In addition, when the communication unit 41 receives the connection demand information from the network apparatus which is connected capable of communicating, according to the connection demand information, the communication unit 41 carries out communication between the network apparatus of the destination or the other relay server, and relays the data forwarding from the network apparatus which demanded the connection. For example, when the terminal 11 is connected capable of communicating by the communication unit 41 and the relay server 4 receives, from the terminal 11, the connection demand information with the terminal 21 which is connected to the relay server 5, the data forwarding is carried out between the terminal 11 and the communication unit 41, and also the data forwarding is carried out between the communication unit 41 and the relay server 5. Furthermore, by carrying out the communication with the terminal 21 by the relay server 5, the communication can be realized substantially between the terminal 11 and the terminal 21. Moreover, the communication can also be carried out between two network apparatuses connected to the relay server 4. In addition, a plurality of connections can be maintained with one network apparatus and the communication between one network apparatus and a plurality of network apparatuses can be carried out by using a plurality of connections.

Further, the structure of the relay server 5 can be constructed in the same manner as the relay server 4. Moreover, the relay server is not to be limited to two bodies, and many more relay servers can be provided on the Internet. In addition, each of the relay servers is not required to be connected to all relay servers and can be connected to the objective relay server via one or a plurality of relay servers.

The connection information holding unit 42 holds the connection information of the network apparatus capable of communicating by the communication unit 41. The connection information includes the user ID and/or information of the connection condition, and for example, the management of the user (network apparatus) capable of communicating via the relay server, and the management of the communication condition can be carried out. In the example shown in FIG. 2, the connection information including information specific to the relay server such as the server name or the IP address, and the information such as the user ID, type, and/or attribution, condition, and the information such as the last renewal date and time of such connection information are held by the connection information holding unit 42. Type is capable of holding the information according to the kind of the network apparatus, for example, information whether it is a terminal of a client, or devices such as FAX or a printer. Attribution is capable of holding various information relating to the information on type, and in FIG. 2, an example is shown, in which the attribution is attached, showing the fact that the transmission and the receiving is to be carried out by the unit of a file. For the information of the condition, for example, it can be held of the information such as whether or not it is during logon, or whether or not the communication is carried out with a different network apparatus after logon. In addition, for the connection information, other various information can be included.

The connection information shown in FIG. 2 can be registered in advance concerning the network apparatus which is connected to the relay server. Moreover, the connection information of the network apparatus which is connected to the different relay server can be obtained and held by the connection information holding unit 42. Accordingly, information such as the connection condition or which relay server the communication is relayed to can be obtained regarding the network apparatus of the destination connected to the different relay server.

Figure 3:
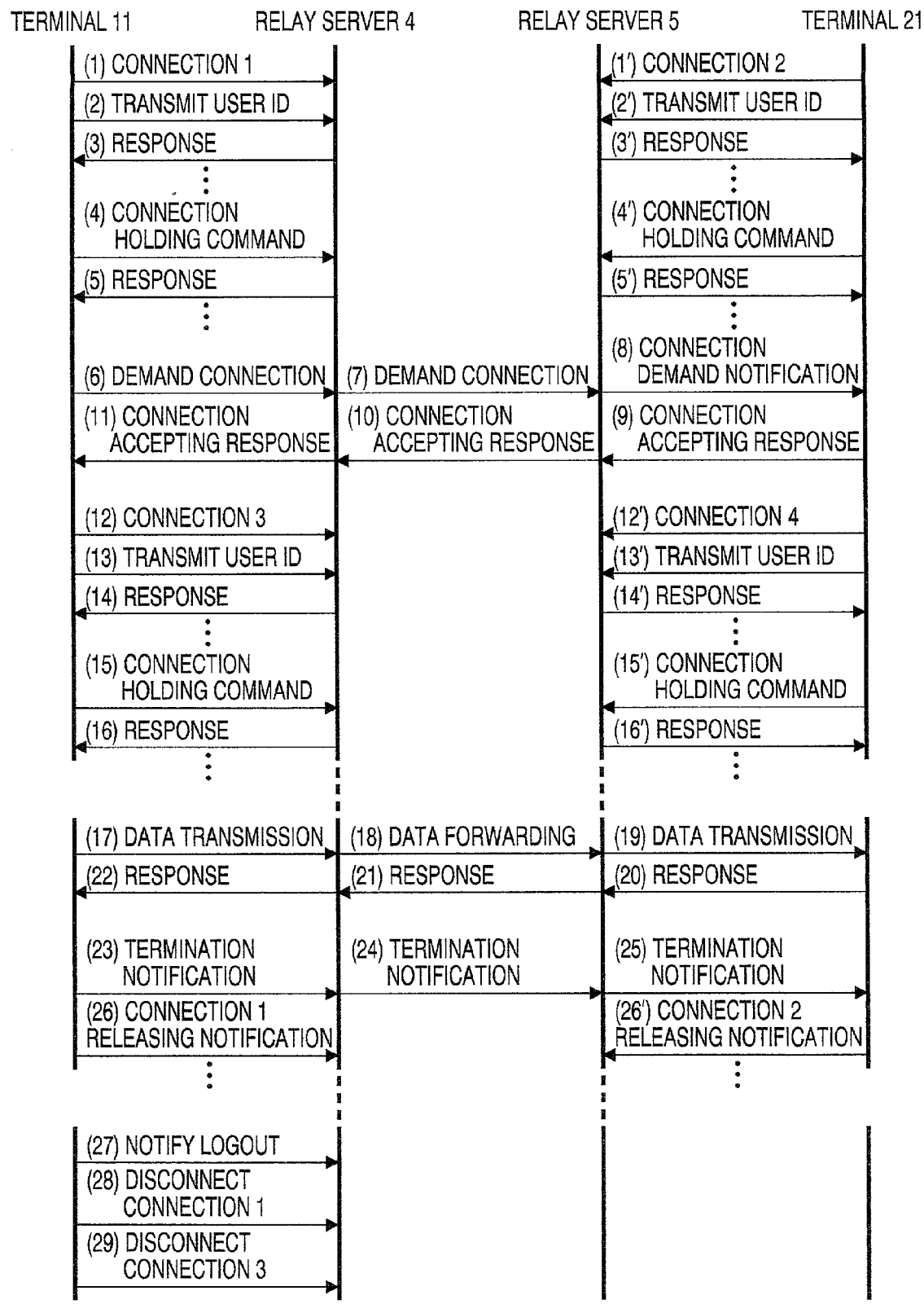
FIG. 3 is a sequence diagram showing an example of a communication procedure in the communication system shown in FIG. 1.

The communication procedure shown in FIG. 3 is carried out by using TCP/IP, and includes such as the connection with the relay server, the maintenance of the connection, the connection demand to the terminal, the data forwarding to the terminal, the termination of the connection with the terminal, and the termination of the connection with the relay server. As an example, it is illustrated of a case in which the communication is carried out between the terminal 11 within the local system 1 and the terminal 21 within the local system 2 shown in FIG. 1. The terminal 11 is to be registered as a user to the relay server 4 and the terminal 21 is to be registered as a user to the relay server 5 in advance. For the information on registration, there is the information of each item of the connection information shown in FIG. 2. In addition, the password or the like can be registered for the certification.

When the terminal 11 is directed after being started or by an operator for example, in the process (1) of FIG. 3, the terminal 11 is connected to the relay server 4 via the gateway 13, performs login, and establishes the TCP/IP connection (connection 1) with the relay server 4. Since the terminal 11 is a network apparatus within the local system 1, the communication cannot be carried out directly from the relay server 4, but the connection can be made to the relay server 4 by the login from the terminal 11 which is a client. Since the TCP/IP connection is capable of carrying out the data communication in both directions, the communication can be carried out from the terminal 11 to the relay server 4, or from the relay server 4 to the terminal 11.

After the connection 1 is established, in the process (2), the terminal 11 transmits the user ID to the relay server 4. The relay server 4 checks whether or not the received user ID is held as the connection information in the connection information holding unit 42. Further, the certification can be carried out by such as the password along with the user ID of the terminal 11. By this certification, the connection with the unspecified third party can be prevented, and the safety can also be obtained. In the case of failing to make the certification in that the connection information is not registered, the relay server 4 carries out negative response to the terminal 11, or disconnects the connection 1 directly. When the certification is succeeded, in the process (3), the positive response is carried out and the connection information of the terminal 11 is changed to the login state. Then, until the connection 1 is disconnected, the relay server 4 controls the connection 1 to be maintained.

When the TCP/IP connection with the relay server 4 is established and the certification is obtained, to maintain the connection (connection 1), in the process (4), a command to hold the connection is transmitted to the relay server 4 periodically, and in the process (5), a response of confirmation is obtained from the relay server 4. The connection is held accordingly, and it is confirmed that the relay server 4 is operating normally.

As in the same manner, in the process (1'), the terminal 21 is connected to the relay server 5 via the gateway 23, performs login, and establishes the TCP/IP connection (connection 2) with the relay server 5. Since the terminal 21 is also the network apparatus within the local system 2, the communication cannot be carried out directly from the relay server 5, but the connection can be made to the relay server 5 by the login from the terminal 21 which is the client. By the connection 2, the communication can be carried out from the terminal 21 to the relay server 5, or from the relay server 5 to the terminal 21.

After the connection 2 is established, in the process (2'), the terminal 21 transmits the user ID to the relay server 5. The relay server 5 checks whether or not the received user ID is registered. Further, the certification is to be carried out by such as the password, along with the user ID of the terminal 21. By the certification, the connection with the unspecified third party can be prevented and the safety can be maintained. In the case of failing to make the certification in that the connection information is not registered, the relay server 5 carries out negative response to the terminal 21, or disconnects the connection 2 directly. When the certification is succeeded, in the process (3'), the positive response is carried out, and the connection information of the terminal 21 is changed to the login state. Then, until the connection 2 is disconnected, the relay server 5 controls the connection 2 to be maintained.

When the TCP/IP connection with the relay server 5 is established and the certification is obtained, to maintain the connection (connection 2), in the process (4'), the command to hold the connection is transmitted to the relay server 5 periodically, and in the process (5'), the response of the confirmation is obtained from the relay server 5. The connection is to be held accordingly, and it is confirmed that the relay server 5 is operating normally.

Further, the connection between the terminal 11 and the relay server 4, and the connection between the terminal 21 and the relay server 5 can be carried out at any time if it is before both of these communications. Moreover, it is necessary that the connections of the two are maintained until the two communications are started.

When a demand is generated that the connection is to be made from the terminal 11 to the terminal 21, in the process (6), the terminal 11 specifies the user ID of the terminal 21 which is demanded for connection, to the relay server 4, and demands the connection. Further, the user ID of the terminal 21, which is to be the connection destination, can be specified by any method such as obtaining it in advance or specifying it by confirming to the list or the like of the user in the login state from the relay server 4. Moreover, the relay server to which the terminal 21 is connected may specify the user ID of the terminal 21 specified from the terminal 11, or obtaining it from the relay server 4 automatically. In the case of determining the other relay server automatically in the relay server 4, it is capable of determining the relay server to be forwarded by various methods such that obtaining the connection information from the other relay server in advance, or inquiring to the other relay server, the data base server or the like. Further, in the case where the relay server 4 fails to determine the relay server to which the terminal 21 corresponding to the specified user ID is connected, the relay server 4 returns the response of error to the terminal 11.

When the relay server 4 specifies the relay server 5 to which the terminal 21 specified by the connection demand is connected, in the process (7), the relay server 4 transmits the connection demand, which is to be transmitted to the terminal 21, to the specified relay server 5. The relay server 5 receives the connection demand being forwarded from the relay server 4, and judges the presence or the absence of the connection of the terminal 21 corresponding to the specified user ID. In the case where the communication cannot be carried out because the terminal 21 is not registered or the login is not made, or the vacant connection is not present due to the fact that the communication is already being carried out, the relay server 5 returns the response of an error to the relay server 4. In such a case, the relay server 4 relays the response of the error to the terminal 11. In the case where the terminal 21 is under the login state and the communication is capable of being carried out, in the process (8), the relay server 4 transmits the connection demand notification including the information that there is a connection demand to the terminal 21 and the user ID of the terminal 11 which is demanding the connection.

The terminal 21 memorizes that the connection used in the transmission of the connection demand notification (connection 2) is being used in the connection with the terminal 11, and in the process (9), returns the response that it can be accepted. Further, when rejecting the connection, the terminal 21 returns the response of error. In the process (10), the relay server 5 forwards the response from the terminal 21 to the relay server 4. At the time being, in the case where the relay server 5 is capable of accepting the response from the terminal 21, the relay server 5 memorizes that the connection 2 is to be used in the communication with the terminal 21, and also memorizes to relay the communication with the connection 2 through the connection with the relay server 4. Moreover, in the process (11), the relay server 4 returns to the terminal 11 the response from the terminal 21 which was forwarded from the relay server 5. At the time being, in the case where the relay server 4 is capable of accepting the response from the terminal 21, the relay server 4 memorizes that the connection (connection 1) related to the connection demand from the terminal 11 (connection 1) is also to be used in the communication with the terminal 11, and also memorizes to relay the communication with the connection 1 through the connection with the relay server 5. Furthermore, in the case the terminal 11 receives the response that terminal 21 is capable of accepting the communication from the terminal 11, which received the response from the terminal 21, the terminal 11 memorizes that the connection in use (connection 1) is also to be used in the communication with the terminal 21.

After it is confirmed of carrying out the communication between the terminal 11 and the terminal 21 in the manner stated above, the data is to be transmitted actually after the process (17). Further, in the example shown in FIG. 3, after the communication between the terminal 11 and the terminal 21 is decided to be carried out, for receiving the connection demand from a different network apparatus and for demanding the connection to a different network apparatus, new TCP/IP connections are to be established to the relay server 4 and the relay server 5 respectively. In other words, in the process (12), the terminal 11 performs login to the relay server 4 to establish the TCP/IP connection (connection 3) with the relay server 4, and in the process (13), the terminal 11 transmits the user ID to the relay server 4. The relay server 4 carries out the certification of the terminal 11 based on the received user ID or the like, and in the process (14), sends back the response. Then, to maintain the connection 3, in the process (15), the connection holding command is transmitted to the relay server 4 from the terminal 11 periodically, and in the process (16), the relay server 4 sends back the response to the terminal 11. As in the same manner, in the process (12'), the terminal 21 performs login to the relay server 5 to establish the TCP/IP connection (connection 4) with the relay server 5, and in the process (13'), the terminal 21 transmits the user ID to the relay server 5. The relay server 5 carries out the certification of the terminal 21 based on the received user ID or the like, and in the process (14'), sends back the response. Then, to maintain the connection 4, in the process (15'), the connection holding command is transmitted to the relay server 5 from the terminal 21 periodically, and in the process (16'), the relay server 5 sends back the response to the terminal 21. Further, in the case where it is not necessary to maintain such vacant connections, the processes of (12)~(16) or (12')~(16') are not necessary. Moreover, in the case where a plurality of connections is already secured, these processes are not required to be carried out.

When it is confirmed of carrying out the communication between the terminal 11 and the terminal 21 by the processes (6)~(11), in the process (17), the terminal 11 transmits the data to the terminal 21 by using the connection 1 to the relay server 4. The relay server 4 receives the data from the terminal 11, and in the process (18), forwards the received data to the relay server 5. The relay server 5 receives the data forwarded from the relay server 4 and in the process (19), transmits to the terminal 21 by using the connection 2. The terminal 21 receives the data from the terminal 11 being transmitted from the relay server 4 through the connection 2, and in the process (20), transmits the response to the terminal 11 to the relay server 5. In the process (21), the relay server 5 forwards to the relay server 4 the response to the terminal 11 which was transmitted by the terminal 21. The relay server 4 receives the response to the terminal 11 from the terminal 21 which was forwarded from the relay server 5, and in the process (22), transmits the received response to the terminal 11 by using the connection 1.

As in the manner stated above, by using the connection 1 between the terminal 11 and the relay server 4, the connection between the relay server 4 and the relay server 5, and the connection 2 between the terminal 21 and the relay server 5, and by relaying the data by the relay server 4 and the relay server 5, the communication can be carried out between the terminal 11 and the terminal 21. Further, the data forwarding to the terminal 21 from the terminal 11 by the processes (17)~(22) can be repeated several times. Moreover, the data forwarding from the terminal 21 to the terminal 11 can be carried out.

When the data forwarding between the terminal 11 and the terminal 21 is completed, the termination notification is carried out from the terminal 11 or the terminal 21. It is to be supposed that the termination notification is carried out from the terminal 11, and in the process (23), the terminal 11 transmits to the relay server 4 the termination notification, which is to be transmitted to the terminal 21, by using the connection 1. The relay server 4 forwards the termination notification to the terminal 21 received from the terminal 11 to the relay server 5 in the process (24). The relay server 5 receives the termination notification to the terminal 21 forwarded from the relay server 4, and in the process (25), the relay server 5 transmits the termination notification to the terminal 21 by using the connection 2. Then in the process (26), the terminal 11 which transmitted the termination notification transmits to the relay server 4 the releasing notification indicating that the connection 1 has become vacant. Moreover, in the process (26'), the terminal 21 which received the termination notification transmits to the relay server 5 the releasing notification indicating that the connection 2 has become vacant. Accordingly, the relay server 4 memorizes that the connection 1 is no longer used for the communication between the terminal 11 and the terminal 21, and that it has become vacant. Moreover, the relay server 5 memorizes that the connection 2 is no longer used for the communication between the terminal 11 and the terminal 21, and that it has become vacant. Further, in this example, the response to the termination notification is not made, but it can be made to carry out the response.

By carrying out the connection holding command and the response periodically as shown in the processes (4), (5), or (4'), (5'), the connection 1 and the connection 2 which were released in such a manner are maintained between the terminal 11 and the relay server 4, and between the terminal 21 and the relay server 5.

Further, at the time being, the connection 1 and the connection 3 are secured between the terminal 11 and the relay server 4. As in the same manner, the connection 2 and the connection 4 are secured between the terminal 21 and the relay server 5. This can be left in this state or the connection 1 and the connection 2 can be disconnected when releasing these two connections. Moreover, the connection 3 and the connection 4 can be disconnected while the connection 1 and the connection 2 can be continued.

When the terminal 11 shuts the power source or when stopping the connection to the relay server 4, in the process (27), the terminal 11 notifies the logout to the relay server 4. At the time being, when a plurality of connections are secured, any connection can be used. Then, the terminal 11 disconnects the connection with the relay server 4. In this example, in the process (28), the connection 1 is disconnected to complete and in the process (29), the connection 3 is disconnected to complete. The relay server 4 receives the notification of the logout from the terminal 11, recognizes the logout of the terminal 11 and disconnects the connections (connection 1, connection 3) with the terminal 11. Further, the logout can be carried out in the terminal 21 to the relay server 5 in the same manner.

By carrying out the procedure mentioned above, even in the case where both of or one of the apparatuses is the network apparatus within the local system, the communication can be carried out. Moreover, even in the case where each of the network apparatus is connected to a different relay server, the communication can be carried out without trouble.

Further, the procedure for carrying out the connection with the relay server 4, the maintenance of the connection, the connection demand to the terminal, the data transmission to the terminal, and the termination of the connection with the terminal, the termination of the connection with the relay server can be realized not to give any influence while transparency of the command or the data to be exchanged by the application protocol working in the upper state is maintained, and the communication can be carried out by using the existing application protocol as it is.

In the example described above, it was illustrated of the case in which the communication is capable of being carried out directly between the relay server to which the network apparatus which demanded a connection is connected, and the relay server to which the network apparatus of the destination is connected. However, the present invention is not to be limited to such a case, and for example, one or a plurality of relay servers can be intervening between two relay servers. In such case, the network apparatus, which demanded the connection can specify the relay path, or each of the relay servers can carry out the routing. Needless to say, in the case where the communication is carried out between the network apparatuses, which are connected to the same relay server, communication can be realized by the relay server relaying the data.

Figure 4:
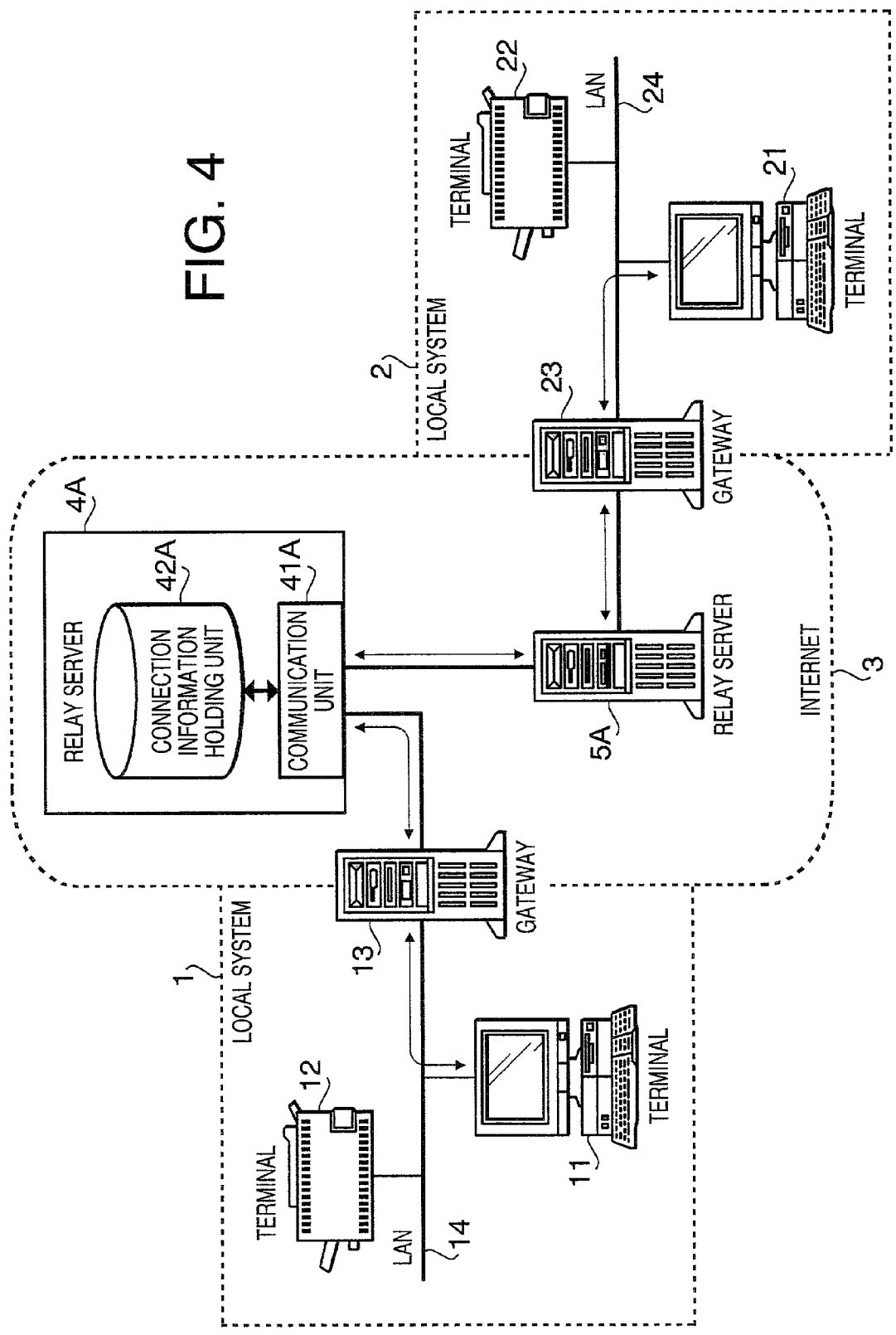
FIG. 4 is a block diagram a communication system including a relay server according to a second embodiment of the present invention.

In FIG. 4, for the same part as that of FIG. 11, same reference number is to be applied and the repetitive description will be abbreviated. The reference numbers 4A, 5A are relay servers, 41A is a communication unit, and 42A is a connection information holding unit. The relay server 4A and the relay server 5A are connected to the Internet 3, and include global IP addresses respectively. The relay server 4A and the relay server 5A receive the login demand to the global IP address from a network apparatus, and secure the communication path by maintaining the connection with the network apparatuses. Moreover, the communication path is assumed to be secured between the relay server 4A and the relay server 5A. The network apparatus can be connected to any one of the relay servers. In the example shown in FIG. 4, it is shown of an example in which the communication path is secured from the terminal 11 or the terminal 12 within the local system 1 to the relay server 4A via the gateway 13, and also from the terminal 21 or the terminal 22 within the local system 2 to the relay server 5A. Further, the relay server 4A and the relay server 5A are capable of maintaining the connection with a plurality of network apparatus respectively.

The relay server 4A and the relay server 5A carry out the communication by relaying the data from the Internet or from the network apparatus within other local system, by using the communication path to such a network apparatus. Moreover, when receiving the connection demand to another network apparatus from the network apparatus, when the destination is securing the connection path to the relay server, the data between the two is relayed by using the communication path and the communication is carried out. In the case where the destination is connected capable of communicating with a different relay server, the data is relayed between the network apparatus which demanded the connection and the different relay server, and at the different relay server which forwards the data, the data is relayed to the network apparatus of the destination, and the communication with the network apparatus is realized.

For example, although the connection can be made from the relay server 4A to the gateway 13 within the local system 1, the connection cannot be made to the terminal 11 or the terminal 12. However, by using the global IP address of the relay server 4A, the connection can be made to the relay server 4A via the gateway 13 from the terminal 11 or the terminal 12. Therefore, by demanding login to the relay server 4A from the terminal 11 or the terminal 12, the communication can be carried out in both directions between the relay server 4A and the terminal 11 or the terminal 12 of which demanded the login. In the same manner, although the connection can be made from the relay server 5A to the gateway 23 within the local system 2, the connection cannot be made to the terminal 21 or the terminal 22. However, by using the global IP address of the relay server 5A, the connection can be made to the relay server 5A via the gateway 23 from the terminal 21 or the terminal 22. Therefore, by demanding a login from the terminal 21 or the terminal 22 to the relay server 4A, the communication can be carried out in both directions between the relay server 5A and the terminal 21 or the terminal 22, which demanded the login. Furthermore, when the relay server 4A and the relay server 5A carry out the communication, the terminal 11 or the terminal 12, and the terminal 21 or the terminal 22 are capable of carrying out the communication via the relay server 4A and the relay server 5A.

The relay server 4A can be constructed by including such as the communication unit 41A and the connection information holding unit 42A. The communication unit 41A is capable of communicating with a plurality of network apparatuses and one or more of relay servers via the Internet 3. In addition, when the communication unit 41A receives the connection demand information from the network apparatus which is connected capable of communicating, according to the connection demand information, the communication unit 41A refers to the connection information within the connection information holding unit 42A and determines the relay server to which the network apparatus of the destination is connected. Then, the communication unit 41A relays the connection demand directly to the relay server or via a different relay server, and relays the data forwarding to the network apparatus, which demanded the connection. For example, when the terminal 11 is connected capable of communicating by the communication unit 41A and the relay server 4A receives the connection demand information with the terminal 21 which is connected to the relay server 5A, the data forwarding is carried out between the terminal 11 and the communication unit 41A, and also the data forwarding is carried out between the communication unit 41A and the relay server 5A. Furthermore, by carrying out the communication with the terminal 21 by the relay server 5A, the communication between the terminal 11 and the terminal 21 is realized substantially. Moreover, the communication can also be carried out between two network apparatuses which are connected to the relay server 4A. In addition, a plurality of connections can be maintained with one network apparatus and the communication with a plurality of network apparatuses can be carried out by one network apparatus using a plurality of connections.

Further, the structure of the relay server 5A can be constructed in the same manner as the relay server 4A. Moreover, the relay server is not to be limited to two bodies, and many more relay servers can be provided on the Internet. In addition, each of the relay servers is not required to be connected to all relay servers and can be connected to the objective relay server via one or a plurality of relay servers.

The communication unit 41A processes the demand of login from the network apparatus or the connection demand to a different network apparatus, and the communication termination after the connection or the logout. When the connection condition with the network apparatus changes, the relay server 4A renews the connection information within the connection information holding unit 42A relating to the network apparatus, and notifies to other relay servers that the connection information has been renewed. This notification can include for example, the connection information after the renewal of all the network apparatuses which are connected to the relay server, or the connection information after the renewal of the network apparatus, whose condition has been changed. Moreover, information such as the renewal date and time, or the information specifying the relay server, which carried out the renewal, can be included.

Moreover, the communication unit 41A receives the notification transmitted from a different relay server, and compares it with the connection information being held by the connection information holding unit 42A. In the case where the connection information is new, the communication unit 41A renews the connection information according to the received notification. Then, the communication unit 41A forwards the received notification to the relay servers other than the relay server which transmitted such notification. Moreover, in the case where the received notification is of the past, older than the connection information being held in the connection information holding unit 42A, the notification is destroyed without renewing the connection information holding unit 42A, and such notification is not forwarded to other relay servers. Accordingly, the connection information being held in the connection information holding unit 42A can be managed to be always the newest, and the notification can be forwarded so that it is sent to all relay servers without the forwarding of the notification being looped.

The connection information holding unit 42A is holding the connection information of the network apparatuses which are capable of being connected to each of the relay servers. The connection information includes information such as the user ID and the connection condition, and it is possible to carry out the management of the user (network apparatus) which is capable of communicating via the relay server, or the management of the communication condition. In the example shown in FIG. 5(A), the connection information including the information specific to the relay server such as the server name, the IP address or the like and the information such as the user ID, type, attribution, condition, and the information such as the last renewal date and time of such connection information are held by the connection information holding unit 42A. Type is capable of holding the information according to the kind of the network apparatus, for example, information whether it is a terminal of a client, or devices such as FAX or a printer. Attribution is capable of holding various information relating to the information on type, and in the example shown in FIG. 5(A), it is shown of an example in which the attribution is added showing the fact that the transmission and the receiving are to be carried out per file. For the information on condition, for example it can be held of the information showing whether or not it is during login, or whether or not the communication is carried out with a different network apparatus after login. In addition, for the connection information, other various information can also be included.

Moreover, when the connection information is renewed, the last renewal date and time is preferable to be added when notifying it to other relay servers. According to the added last renewal date and time, the relay server which received the notification becomes capable of judging whether or not it is the newest information.

Further, the connection information per each network apparatus shown in FIG. 5(A) can be registered in advance by specifying the network apparatus which is to be connected to the relay server. Accordingly, the login demand from the network apparatus other than the ones registered can be rejected, and the safety can be maintained. Furthermore, by holding the certifying data such as the passwords, the safety can be improved.

In the connection information holding unit 42A, the connection information sent from other relay servers is held, other than the connection information of the network apparatus, which is to be connected to the relay server 4A. For example, as shown in FIG. 5(B), this connection information can be held as the connection information per each relay server. In such a manner, by managing the connection information per relay server, the relay server to which the network apparatus of the destination is connected can be determined promptly when each relay server receives the connection demand from a network apparatus to the different network apparatus. Moreover, the condition of the network apparatus of the destination can also be learned, and for example, in the case where the network apparatus of the destination is not in the login state, without relaying to the different relay server, the connection demand can be made as an error.

Figure 6:
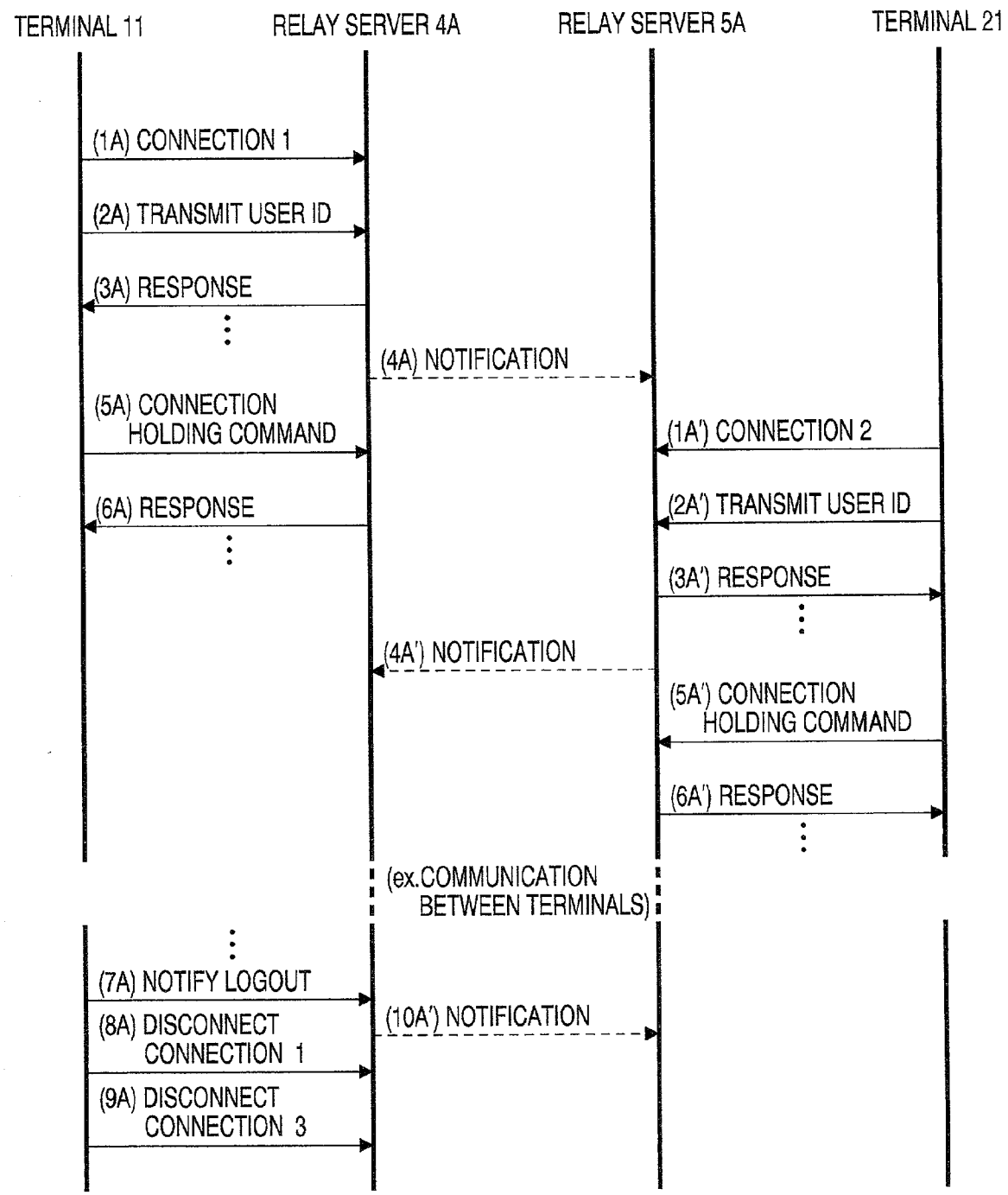
FIG. 6 is a sequence diagram showing an example of a communication procedure at the time of log-in and log-out in the communication system shown in FIG. 4.
Figure 7:
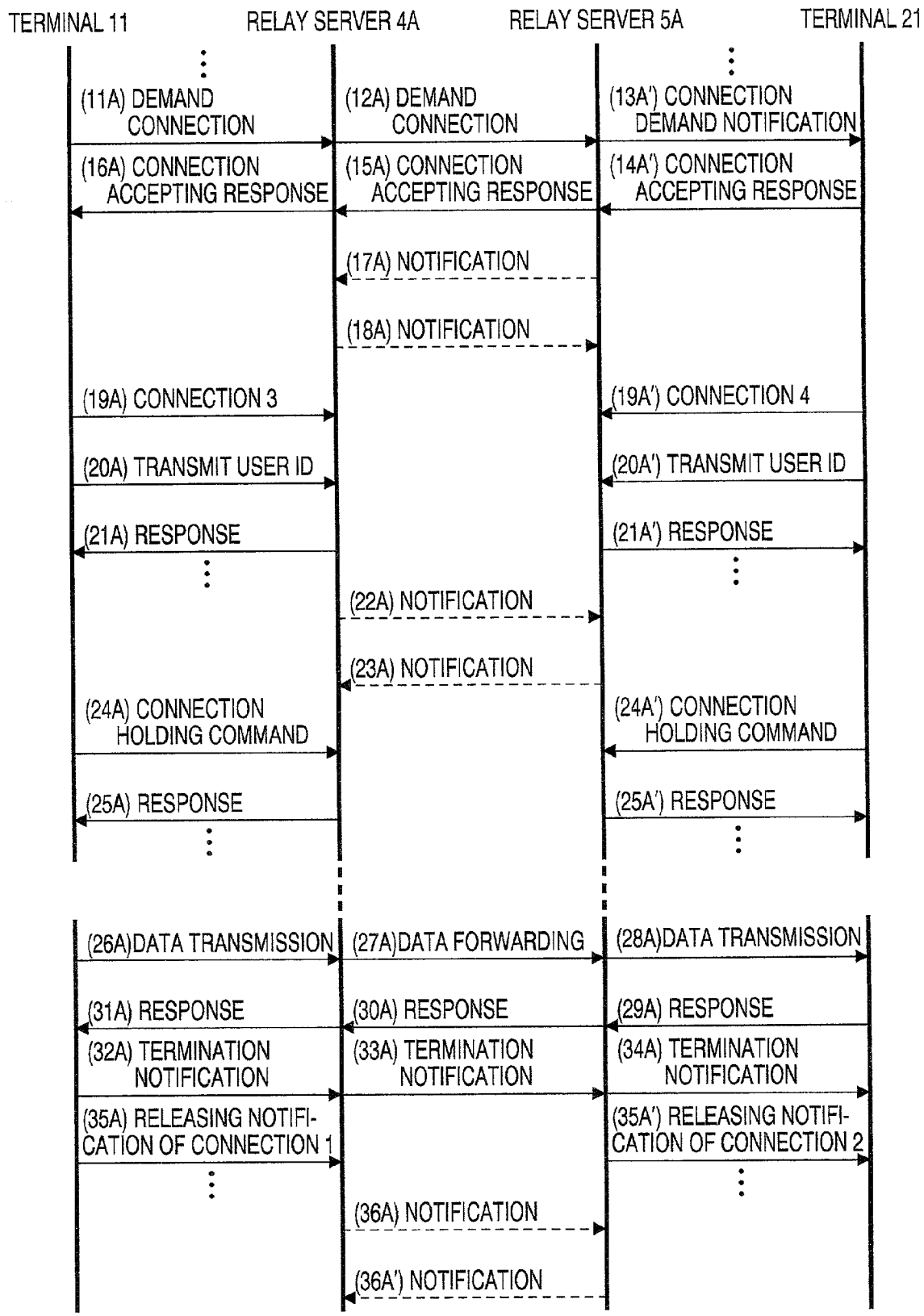
FIG. 7 is a sequence diagram showing an example of a communication procedure when demanding a connection in the communication shown in FIG. 4.

The communication procedure shown in FIG. 6 and FIG. 7 is carried out by using the TCP/IP, and is also provided for carrying out the connection with the relay server, the maintenance of the connection, the connection demand to the terminal, the data forwarding to the terminal, the connection termination with the terminal and the connection termination with the relay server. The parts of the connection with the relay server, the maintenance of the connection, the connection termination with the relay server are shown in FIG. 6, and the parts of the connection demand to the terminal, the data forwarding to the terminal, the connection termination with the terminal are shown in FIG. 7.

As an example, it is illustrated of a case in which the communication is carried out between the terminal 11 within the local system 1 and the terminal 21 within the local system 2 in FIG. 4. The terminal 11 is to be registered as the user to the relay server 4A and the terminal 21 is registered as the user to the relay server 5A in advance. For the information of registration, there is information of each item of the connection information shown in FIG. 5(A) for example. Moreover, the password or the like can be registered for the certification. This connection information is grasped as the renewal of the connection information when registering for example and is notified from the relay server to which the network apparatus is registered, to other relay server. Accordingly, the relay server 4A and the relay server 5A are to share the connection information of one another.

When the terminal 11 is directed after being started or by the operator for example, in the process (1A), the terminal 11 is connected to the relay server 4A via the gateway 13, performs login, and establishes the TCP/IP connection (connection 1) with the relay server 4A. Since the terminal 11 is the network device within the local system 1, the communication cannot be carried out directly from the relay server 4A, but the connection can be made to the relay server 4A by the login from the terminal 11 which is a client. Since the TCP/IP connection is capable of data communication in both directions, the communication can be carried out from the terminal 11 to the relay server 4A, or from the relay server 4A to the terminal 11.

After the connection 1 is established, in the process (2A), the terminal 11 transmits the user ID to the relay server 4A. The relay server 4A checks whether or not the received user ID is held as the connection information in the connection information holding unit 42A. Further, the certification can be carried out by such as the password along with the user ID of the terminal 11. By this certification, the connection with the unspecified third party can be prevented, and the safety can also be maintained. In case where the connection information is not registered or in the case of failing to make certification, the relay server 4A carries out negative response to the terminal 11, or disconnects the connection 1 directly. When the certification is succeeded, in the process (3A), the positive response is carried out and changes the connection information of the terminal 11 into the login state. In the process (4A), the relay server 4A notifies the renewal of the connection information to other relay servers (here, to the relay server 5A). When receiving such notification, the relay server 5A renews the connection information of the relay server 4A, and corresponds it with the connection information being held by the relay server 4A.

When the TCP/IP connection with the relay server 4A is established and the certification is obtained, to maintain the connection (connection 1), in the process (5A), the command to hold the connection is transmitted to the relay server 4A periodically, and in the process (6A), the response of confirmation is obtained from the relay server 4A. The connection is to be held accordingly, and it is confirmed that the relay server is operating normally. In such a manner, the connection 1 which is capable of communicating between the terminal 11 and the relay server 4A is maintained.

As in the same manner, in the process (1A'), the terminal 21 makes connection to the relay server 5A via the gateway 23, performs login, and establishes the TCP/IP connection (connection 2) with the relay server 5A. Since the terminal 21 is the network apparatus within the local system 2, the communication cannot be carried out directly from the relay server 5A, however, the connection can be made to the relay server 5A by the login from the terminal 21 which is the client. By the connection 2, the communication can be carried out from the terminal 21 to the relay server 5A, or from the relay server 5A to the terminal 21.

After the connection 2 is established, in the process (2A'), the terminal 21 transmits the user ID to the relay server 5A. The relay server 5A checks whether or not the received user ID is registered. Further, the certification is to be carried out by the password or the like, along with the user ID of the terminal 11. By the certification, the connection with the unspecified third party can be prevented and the safety can be maintained. In a case where the connection information is not registered or in the case of failing to make certification, the relay server 5A carries out the negative response to the terminal 21, or disconnects the connection 2 directly. When the certification is succeeded, in the process (3A'), the positive response is carried out, and the connection information of terminal 21 is changed into the login state. In the process (4A'), the relay server 5A notifies the renewal of the connection information to other relay servers (here, to the relay server 4A). When receiving such notification, the relay server 4A renews the connection information relating to the relay server 5A held by the relay server 4A and corresponds it with the connection information being held by the relay server 5A.

When the TCP/IP connection with the relay server 5A is established and the certification is obtained, to maintain the connection (connection 2), in the process (5A'), the command to hold the connection is periodically transmitted to the relay server 5A, and in the process (6A'), the response of confirmation is obtained from the relay server 5A. The connection is to be maintained accordingly and it is confirmed that the relay server is operating normally. The connection 2 which is capable of communicating between the terminal 21 and the relay server 5A, is maintained in such a manner.

Further, the connection between the terminal 11 and the relay server 4A, and the connection between the terminal 21 and the relay server 5A can be carried out at any time if it is before both of these communications. When the terminal within the local system is connected to any one of the relay servers, the communication can be carried out between those terminals. The sequence when carrying out the communication between the terminals is shown in FIG. 7.

When a demand is generated in that the connection is to be made from the terminal 11 to the terminal 21, in the process (11A), the terminal 11 specifies, to the relay server 4A, the user ID of the terminal 21 which is demanded for the connection and demands the connection to the relay server 4A. Further, the user ID of the terminal 21, which is to be the destination, can be specified by any method such as obtaining it in advance, or specifying it by confirming to the list or the like of the user in the login state from the relay server 4A.

The relay server 4A refers to the connection information being held by the connection information holding unit 42A, and specifies which relay server the network apparatus including the user ID specified from the terminal 11 is connected to. Further, in the case where the relay server 4A fails to obtain the connection information relating to the specified user ID or in the case the network apparatus corresponding to the specified user ID is not in the login state, the relay server 4A sends back the response of an error to the terminal 11.

When the relay server 4A specifies the relay server 5A to which the terminal 21 specified by the connection demand is connected, in the process (12A), the relay server 4A transmits to the specified relay server 5A the demand to be connected with the terminal 21. The relay server 5A receives the connection demand forwarded from the relay server 4A, and in the process (13A), the relay server 5A transmits, to the terminal 21, the connection demand notification including the information that there is the connection demand to the terminal 21 and the user ID of the terminal 11 which is demanding the connection.

The terminal 21 memorizes that the connection used in the transmission of the connection demand notification is used in the connection with the terminal 11, and in the process (14A), returns the response that it can be accepted. Further, when rejecting the connection, the terminal 21 returns the response of an error. In the process (15A), the relay server 5A forwards the response from the terminal 21 to the relay server 4A. At the time being, when it is of the response that the terminal 21 accepts the connection demand, the terminal 21 renews the connection information relating to the connection 2 and memorizes that the connection 2 is to be used in the communication with the terminal 11, and in the process (17A), the terminal 21 notifies other relay servers (relay server 4A) the renewal of the connection information.

On the other hand, in the process (16A), the relay server 4A sends back to the terminal 11 the response from the terminal 21 which was forwarded from the relay server 5A. When the response from the terminal 21 is the response that the connection demand is accepted, the relay server 4A renews the connection information relating to the connection 1 of the terminal 11 and memorizes that the connection 1 is to be used in the communication with the terminal 21, and in the process (18A), notifies the renewal of the connection information to other relay servers (relay server 5A). Moreover, when receiving the response that it can be accepted, the terminal 11 which received the response from the terminal 21 memorizes that the connection in use (connection 1) is to be used in the communication with the terminal 21.

Further, when the relay server 4A receives the notification from the relay server 5A, the relay server 4A renews the connection information the relay server 5A holds, and corresponds it with the connection information, which is held by the relay server 5A. Moreover, the relay server 5A also receives the notification from the relay server 4A and renews the connection information the relay server 4A holds, and corresponds it with the connection information, which is held by the relay server 4A. The order of the notification on the renewal of the connection information in the processes (17A) and (18A) can be changed according to the communication path.

When it is confirmed of carrying out the communication between the terminal 11 and the terminal 21 in the manner stated above, the data is to be transmitted actually after the process (26A). Further, in the example shown in FIG. 7, after the communication is decided to be carried out between the terminal 11 and the terminal 21, for receiving the connection demand from a different network apparatus and for carrying out the connection demand to a different network apparatus, new TCP/IP connections are established to the relay server 4A and the relay server 5A respectively. In other words, in the process (19A), the terminal 11 performs login to the relay server 4A to establish the TCP/IP connection (connection 3) with the relay server 4, and in the process (20A), the terminal 11 transmits the user ID to the relay server 4A. The relay server 4A carries out the certification of the terminal 11 based on the received user ID or the like, and in the process (21A), sends back the response. At the same time, the relay server 4A renews the connection information relating to the terminal 11, and in the process (22A), notifies to other relay servers (here, to the relay server 5A). When receiving the notification from the relay server 4A, the relay server 5A renews the connection information of the relay server 4A. Then, to maintain the new connection 3, in the process (24A), the terminal 11 transmits the connection holding command to the relay server 4A periodically, and in the process (25A), the relay server 4A sends back the response to the terminal 11.

As in the same manner, in the process (19A'), the terminal 21 performs login to the relay server 5A to establish the TCP/IP connection (connection 4) with the relay server 5A, and in the process (20A'), the terminal 21 transmits the user ID to the relay server 5A. The relay server 5A carries out the certification of the terminal 21 based on the received user ID or the like, and in the process (21A'), sends back the response. At the same time, the relay server 5A renews the connection information relating to the terminal 21, and in the process (23A'), notifies it to other relay servers (here, to relay server 4A). The relay server 4A receives the notification from the relay server 5A and renews the connection information of the relay server 5A. To maintain a new connection 4, in the process (24A'), the connection holding command is transmitted to the relay server 5A from the terminal 21 periodically, and the relay server 5A sends back the response to the terminal 21 in the process (25A'). Further, in the case where it is not necessary to maintain such vacant connection, the processes of (19A)~(25A) or (19A')~(25A') are not necessary. Moreover, in the case a plurality of connections are already secured, these processes are not required to be carried out.

When it is confirmed of carrying out the communication between the terminal 11 and the terminal 21 by the processes (11A)~(18A), in the process (26A), the terminal 11 transmits the data to be transmitted to the terminal 21 by using the connection 1 to the relay server 4A. The relay server 4A receives the data from the terminal 11, and in the process (27A), forwards the received data to the relay server 5A. The relay server 5A receives the data forwarded from the relay server 4A and in the process (28A), transmits it to the terminal 21 by using the connection 2. The terminal 21 receives the data from the terminal 11 transmitted from the relay server 4A through the connection 2, and in the process (29A), transmits to the relay server 5A the response to the terminal 11. In the process (30A), the relay server 5A forwards to the relay server 4A the response directed to the terminal 11 which was transmitted by the terminal 21. The relay server 4A receives the response directed to the terminal 11 from the terminal 21 which was forwarded from the relay server 5A, and in the process (31A), transmits the received response to the terminal 11 by using the connection 1.

As in the manner stated above, by using the connection 1 between the terminal 11 and the relay server 4A, the communication between the relay server 4A and the relay server 5A, and the connection 2 between the terminal 21 and the relay server 5A, and by relaying the data by the relay server 4A and the relay server 5A, the communication can be carried out between the terminal 11 and the terminal 21. Further, the data forwarding to the terminal 21 from the terminal 11 by the processes (26A)~(31A) can be repeated several times. Moreover, the data can be forwarded from the terminal 21 to the terminal 11.

When the data forwarding between the terminal 11 and the terminal 21 is completed, the termination notification is carried out from the terminal 11 or the terminal 21. It is to be supposed that the termination notification is carried out from the terminal 11, and in the process (32A), the terminal 11 transmits to the relay server 4A the termination notification relating to the terminal 21 by using the connection 1. The relay server 4A forwards the termination notification to the terminal 21 received from the terminal 11 to the relay server 5A in the process (33A). The relay server 5A receives the termination notification to the terminal 21 forwarded from the relay server 4A, and in the process (34A), the relay server 5A transmits the termination notification to the terminal 21 by using the connection 2. Then in the process (35A), the terminal 11 which transmitted the termination notification transmits the releasing notification indicating that the connection 1 has become vacant to the relay server 4A. Moreover, in the process (35A'), the terminal 21 which received the termination notification transmits the releasing notification indicating that the connection 2 has become vacant to the relay server 5A. Accordingly, the relay server 4A renews the connection information of the connection 1 such that the connection is not to be used for the communication between the terminal 11 and the terminal 21 from the time being and the connection is to be vacant, and notifies such fact to other relay server (here, to relay server 5A) in the process (36A). Moreover, the relay server 5A renews the connection information of the connection 2 such that the connection is not to be used for the communication between the terminal 11 and the terminal 21 from the time being and the connection is to be vacant, and notifies such fact to other relay servers (here, to the relay server 4A) in the process (36A'). The relay server 4A and the relay server 5A, which received the renewal notification of the connection information respectively, renew the connection information according to the notification. Further, in this example, the respond to the termination notification is not carried out, but the response can be sent back.

By carrying out the connection holding command and the response periodically as shown in the process (5A), (6A), or (5A'), (6A'), the connection 1 and the connection 2 which were released in such a manner are maintained between the terminal 11 and the relay server 4A, and between the terminal 21 and the relay server 5A. Further, at the time being, the connection 1 and the connection 3 are secured between the terminal 11 and the relay server 4A. As in the same manner, the connection 2 and the connection 4 are secured between the terminal 21 and the relay server 5A. This can be left in this state or the connection 1 and the connection 2 can be disconnected when releasing these connections. Moreover, the connection 1 and the connection 2 can be continued and the connection 3 and the connection 4 can be disconnected.

Returning to FIG. 6, for example, when the terminal 11 shuts the power source or when stopping the connection to the relay server 4A, in the process (7A), the terminal 11 notifies the logout to the relay server 4A. At the time being, when a plurality of connections are secured, any connection can be used. Then, the terminal 11 disconnects all the connections. In this example, in the process (8A), the connection 1 is to be disconnected first. Moreover, since the connection 3 was provided during the communication with the terminal 21 in FIG. 7, in the process (9A), the connection 3 is also to be disconnected and completed.

The relay server 4A receives the notification of the logout from the terminal 11 and also renews the connection information. Moreover, in the process (10A), the relay server 4A notifies the renewal of the connection information to other relay servers (here, to the relay server 5A). The relay server 5A is to renew the connection information of the relay server 4A based on the notification. Moreover, the relay server 4A disconnects the connection 1 and the connection 3 by the logout of the terminal 11. Further, in the same manner, the logout can be carried out to the relay server 5A in the terminal 21.

By carrying out the procedure mentioned above, in the case where each of the apparatuses is the network apparatus within the local system, the communication can be carried out to a different network apparatus within a different local system. Moreover, even when each of the network apparatuses is connected to a different relay server, the communication can be carried out without trouble. At the time being, it is not necessary to know which relay server the connection is directed to, and the communication can be carried out easily.

Further, the procedure for carrying out the connection with the relay server 4A, the maintenance of the connection, the connection demand to the terminal, the data transmission to the terminal, the connection termination with the terminal, and the connection termination with the relay server can be realized not to give any influence while transparency of the command or the data to be exchanged by the application protocol working in the upper state is maintained, and the communication can be carried out by using the existing application protocol.

In aforementioned example, it was illustrated of the case in which the communication can be carried out directly between the relay server to which the network apparatus which demanded the connection is connected, and the relay server to which the network apparatus of the destination is connected. However, the present invention is not to be limited to such a case, and for example, one or a plurality of relay server can be intervening between two relay servers. In such a case, the relay servers are each to carry out the routing respectively.

Moreover, the notification when the connection information is renewed can be carried out to one another in the example shown above. In addition, in the case where the communication can be carried out directly to all the relay servers, the relay server of which carried out the renewal can notify it to each of other relay servers. However, in the case where there is a relay server which cannot carry out the communication directly, some means is to be required such that the relay server is to relay the notification. As one method for spreading the notification regardless of the connection form of a plurality of relay servers, there is a method in that each of the relay servers is constructed to forward the notification to all the relay servers which can carry out the communication directly to each other, except for the relay server which transmitted the notification.

Accordingly, the notification can be sent in any route if the communication path is being connected. However, in such a case, there is a possibility in that the information is circulated by the loop. To prevent this, the renewal date and time during notification is referred to, and the notification which is older than the renewal date and time of the connection information being saved is to be destroyed, and the forwarding is not to be carried out any more.

Figure 8:
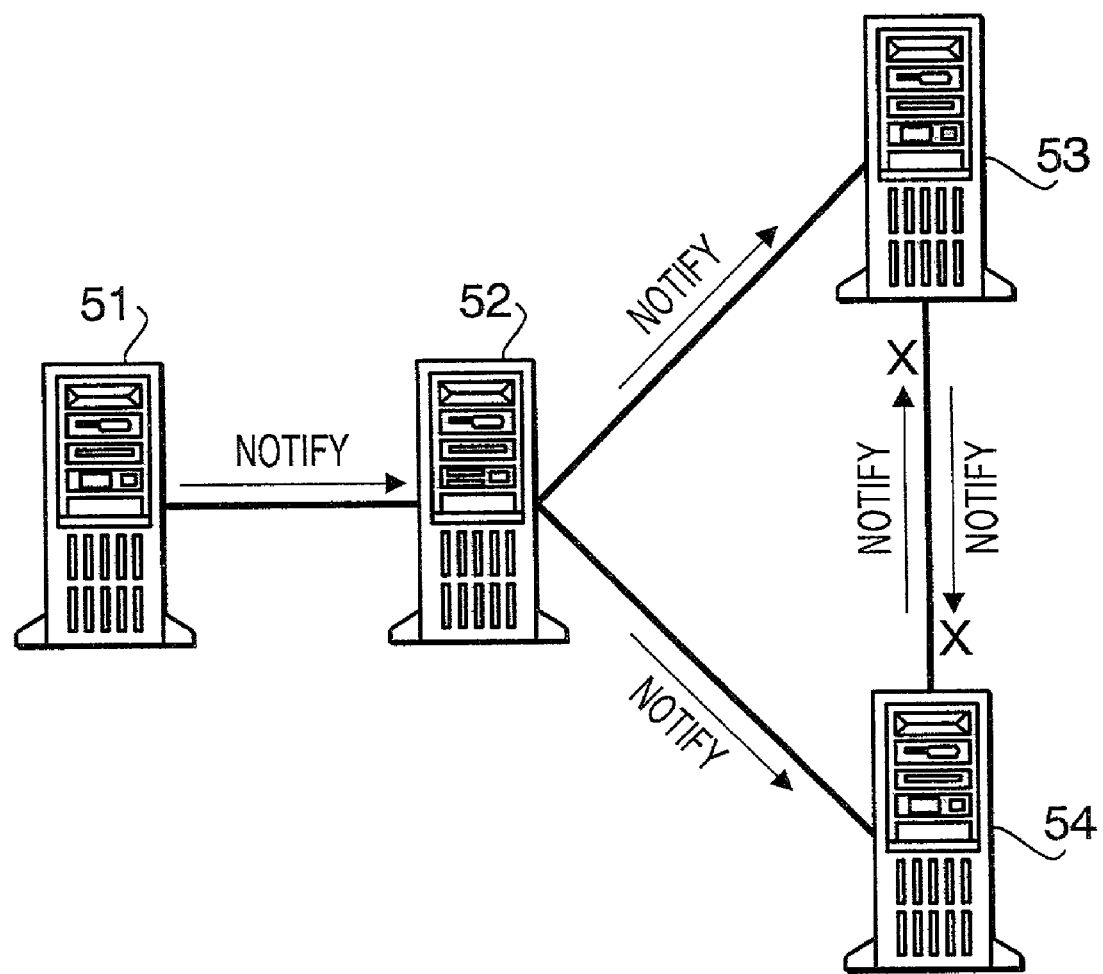
FIG. 8 is a view useful for explaining an example of the forwarding method of the notification between relay servers.

In FIG. 8, the reference numbers 51 through 54 are relay servers. In this example, the communication path is established between the relay server 52 and the relay servers 51, 53, 54. Moreover, the communication paths are also established between the relay server 53 and the relay server 54. For example, in the case of notifying by renewing the connection information in the relay server 51, the relay server 51 notifies it to the relay server 52. The relay server 52 renews the connection information according to the notification, and then forwards the notification to other relay servers which are capable of communicating to each other, other than the relay server 51 which transmitted such notification, in other words, to the relay server 53 and the relay server 54. The relay server 53 renews the connection information following the received notification, and forwards the notification to other relay servers which are capable of communicating to each other, other than the relay server 52 which transmitted such notification, in other words, to the relay server 54. In the same manner, the relay server 54 renews the connection information based on the notification received from the relay server 52, and forwards the notification to other relay servers which are capable of communicating to each other, other than the relay server 52 which transmitted such notification, in other words, to the relay server 53.

The relay server 53 receives the notification from the relay server 54, but since the same notification is already received from the relay server 52, the relay server 53 destroys such notification because it is before the renewal date and time, and does not carry out the notification any more. In the same manner, the relay server 54 receives the notification from the relay server 53, but since the same notification is already received from the relay server 52, the relay server 54 destroys the notification for it is of before the renewal date and time, and does not carry out the notification any more. In such manner, the notification is to be spread to all relay servers, and the notification is prevented from being looped among the relay servers 52, 53, and 54.

Figure 9:
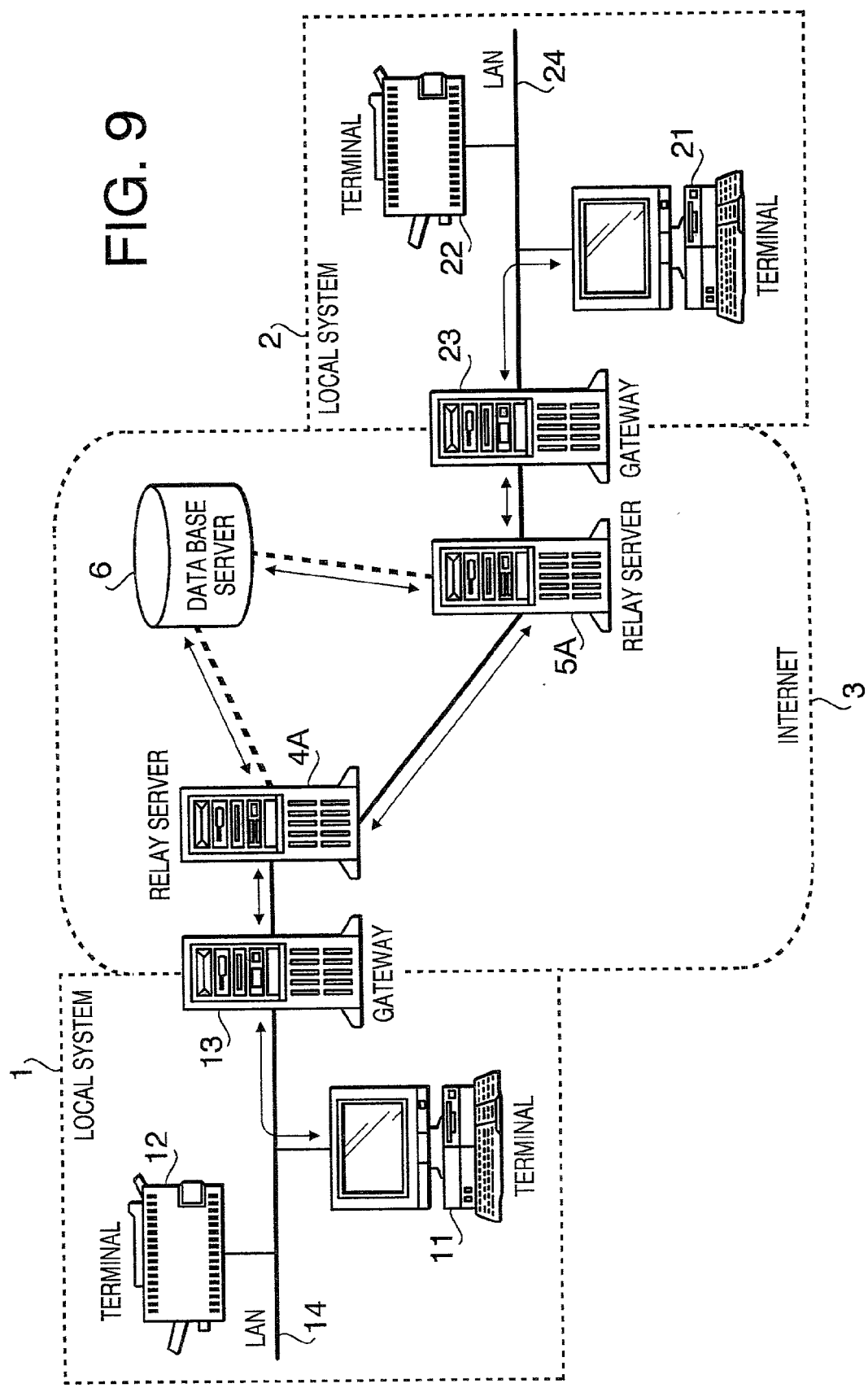
FIG. 9 is a block diagram showing a communication system including a relay server according to a third embodiment of the present invention.

In FIG. 9, for the same part as that of FIG. 4, the same reference number is to be applied and the description will be abbreviated. Reference number 6 is a data base server. In the aforementioned second embodiment, it was illustrated of a case in which the connection information in each of the relay servers was shared by notifying between the relay servers. In this case, it is necessary to hold the same connection information in each of the relay servers. In a third embodiment of FIG. 9, it is illustrated of a case in which all the connection information held by the respective relay servers is held by the data base server 6, and shared by the relay servers.

The data base server 6 is holding the connection information as shown in FIG. 5(B) for example per each of the relay server, and provides the connection information according to the inquiry from the relay server. Moreover, according to the connection demand from the relay server, the data base server 6 renews the connection information of the relay server which demanded the renewal.

When changes occur in the login demand from the network apparatus or the connection demand to a different network apparatus, and the connection condition to the network apparatus such as the communication termination after the connection or logout, the relay server 4A and the relay server 5A demand to the data base server 6 the renewal of the connection information corresponding to the network apparatus. Moreover, when receiving the connection demand from the network apparatus, the relay server 4A and the relay server 5A obtain the connection information of the network apparatus of the destination from the data base server 6, and determine the relay server to which the network apparatus of the destination is connected. At the time being, the connection condition of the network apparatus of the destination is judged and it is also capable of judging whether or not the communication can be carried out. Furthermore, before carrying out the connection demand from the network apparatus, the relay server obtains from the data base server 6 a list of information of the network apparatuses which are capable of carrying out the communication, and this can be provided to the network apparatus being connected.

The communication procedure according to the third embodiment is almost the same as the procedure shown in FIG. 6 and FIG. 7, and only the different parts will be described. First, the TCP/IP connection is established from the network apparatus, and when carrying out the certification based on the user ID or the like, the relay server inquires to the data base server 6, the connection information or the registered information of the network apparatus, and can carry out the certification by obtaining the connection information corresponding to the network apparatus. Moreover, the registered information of the network apparatus can be held by the relay server, and the certification can be carried out according to the registered information being held. After the certification, when permitting the connection, the renewal of the connection information is to be demanded to the data base server 6. This operation is the same when securing other connections when demanding the connections.

In the case the connection demand is received from the network apparatus which is connected to the relay server, the connection information of the destination is inquired to the data base server 6, and the connection information is obtained. Following the obtained connection information, the relay server to which the network apparatus of the destination is connected is determined, and it is checked whether or not the network apparatus of the destination is capable of carrying out the communication. When the network apparatus of the destination is capable of carrying out the communication, the connection is demanded to the determined relay server. When the network apparatus of the destination approves the communication, the relay server to which the network apparatus of the destination is connected, and the relay server to which the network apparatus which demanded the connection is connected demand the renewal of the connection information to the data base server 6. Then, the data communication is carried out between the network apparatuses After the communication is completed, the termination notification is forwarded between the network apparatuses, and when receiving the releasing information of the connection from each of the network apparatuses, the relay server to which each of the network apparatuses is connected demands the renewal of the connection information to the data base server 6. Moreover, when the logout is notified from the network apparatus, the relay server demands the renewal of the connection information to the data base server 6.

As in the manner stated above, each time the connection condition of the network apparatus and the relay server changes, by demanding the renewal to the data base server 6, the newest connection information of all the relay servers are to be held by the data base server 6 at all times. By sharing the newest connection information of a plurality of relay servers, even when each of the relay servers is not holding the connection information, the communication between the network apparatuses can be managed.

Figure 10:
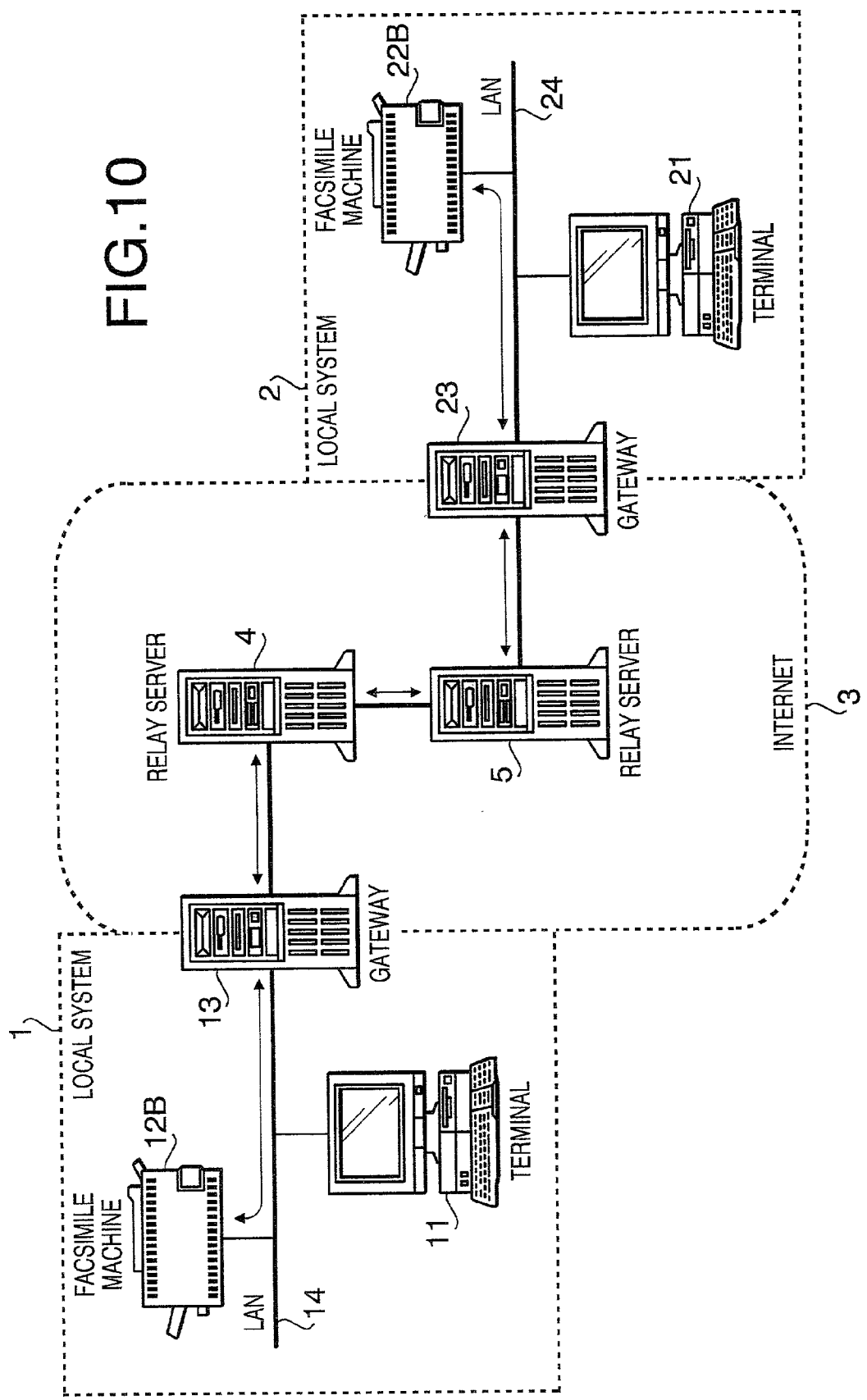
FIG. 10 is a block diagram showing a facsimile system according a fourth embodiment of the present invention.

In FIG. 10, for the same parts as those of FIG. 1, the same reference numbers are to be applied and the repetitive description will be abbreviated. By carrying out the data forwarding also between the relay servers, the facsimile communication can be carried out between facsimile machines which are connected to different relay servers. FIG. 10 shows an example in which the relay server 4 and the relay server 5 carry out the communication. Moreover, it is possible to make a structure such that much more relay servers exist and the communication is carried out between the relay servers. In addition, it is possible to make a structure such that the relaying is carried out by relay servers of three bodies or more.

The relay server 5 and the relay server 4 have the same structure, are connected to the Internet 3, and include global IP addresses respectively. Moreover, the communication path is to be secured between the relay server 4 and the relay server 5. The network apparatus can be connected to any one of the relay servers. In the example shown in FIG. 10, the communication paths are secured between a facsimile machine 12B within the local system 1 and the relay server 4 via the gateway 13, and also between a facsimile machine 22B within the local system 2 and the relay server 5. Further, the relay server 4 and the relay server 5 are capable of maintaining the connection between plurality of network apparatuses.

As in the manner stated above, the communication can be carried out in both directions by the facsimile machine 12B and the relay server 4 being connected, and when the communication can also be carried out in both direction by the facsimile machine 22B and the relay server 5 being connected, the communication between the facsimile machine 12B and the facsimile machine 22B can be carried out by using the communication between the relay server 4 and the relay server 5. In other words, for example, in the case of transmitting an image from the facsimile machine 12B to the facsimile machine 22B, the image is to be transmitted first from the facsimile machine 12B to the relay server 4. The relay server 4 forwards the image received from the facsimile machine 12B to the relay server 5. The relay server 5 which received the forwarded image transmits the image to the facsimile machine 22B. In such a manner, the image can be transmitted from the facsimile machine 12B to the facsimile machine 22B.

Further, the communication procedure when carrying out such facsimile communication can be carried out in the same manner as the one shown in FIG. 3. In the example shown in FIG. 10, in the case of transmitting the image from the facsimile machine 12B to the facsimile machine 22B, when the relay server 4 forwards the data to the facsimile machine 22B, such data is transmitted to the relay server 5, and the relay server 5 forwards the data to the facsimile machine 22B. Moreover, the data transmitted from the facsimile machine 22B is transmitted to the relay server 4 via the relay server 5 and such data is to be transmitted to the facsimile machine 12B. Other processes may be the same as those of FIG. 3.

When carrying out the facsimile communication by such a procedure, in the system where a plurality of relay servers exist, the relay server to which the facsimile machine of the transmitting side is connected is required to know to which relay server the facsimile machine of the destination is connected. For example, by specifying each relay server from the facsimile machine of the transmitting side, each of the relay servers is capable of relaying the image.

However, when specifying the relay server from the facsimile machine of the transmitting side, it is necessary for the user to know which relay server each of the facsimile machines is connected to, and the connection between the relay servers. For a method to reduce such burden on the user, and allow the communication to be carried out by just specifying the ID of the facsimile machine of the destination, there is a method in that the relay server carries out the routing. For example, each relay server is to hold the information (connection information) of the facsimile machine which is connected to each of the relay servers, and it can be constructed such that each time there is a change in the connection information, the renewed connection information relating to other relay servers is transmitted. Accordingly, it can be always grasped which facsimile machine is connected to each of the relay servers. As a result, when receiving the connection demand, it can easily determine the relay server to which the facsimile machine of the destination is connected. Moreover, in the facsimile machine which is connected to a different relay server, such connection information is available, and for example, it can be judged of the presence or the absence of the connection without inquiring other relay servers when demanding the connection. Furthermore, various services can be provided, such as providing a list of the facsimile machines which are capable of communicating in all relay servers.

Moreover, for example, it can be constructed for the data base server to manage all the connection information being held by each relay server. In such a case, the relay server carries out the inquiry to the data base server to make certification when the facsimile machine performs login, and to determined the relay server of the destination. Moreover, in the case here changes occur in the connection information of the facsimile machine being connected, the renewal of the connection information is requested to the data base server. Accordingly, the connection information is to be shared and used by all the relay servers. In such a case, in the facsimile machine, which is connected to any one of the relay servers, the connection conditions can be confirmed and for example, it can be judged of the presence or the absence of the connection without inquiring to other relay servers when demanding the connection. Moreover, various services can be provided, such that providing a list of facsimile machines which are capable of carrying out the communication in all relay servers.

What is claimed is:

1. A relay server comprising:
communicating means for communicating with a plurality of network devices using TCP/IP connections that are established and held in response to authenticated login demands from the plurality of network devices, and for communicating with a different relay server; and
connection information holding means for holding connection information of the plurality of network devices capable of communicating by the communicating means;

wherein TCP/IP connections are authenticated by comparing the login demand with the connection information stored in the connection information holding means, and wherein the communicating means refers to the connection information based on a connection demand from one of the plurality of network devices having a held TCP/IP connection with the relay server, and relays communication via the different relay server to another one of the plurality of network devices having a held TCP/IP connection with the different relay server.

2. The relay server according to claim 1 wherein the communicating means receives the connection information the different relay server holds and stores the connection information in the connection information holding means.

3. A relay server as claimed in claim 1, wherein the connection information includes user identification, password and renewal date.

4. A communication system comprising:
a plurality of network devices; and
a plurality of relay servers connected to the plurality of network devices by a network,
wherein one of the plurality of network devices lags into and establishes an authenticated held TCP/IP connection with one of the plurality of relay servers and carries out communication by performing a connection demand with another one of the plurality of network devices that has logged into and established an authenticated held TCP/IP connection with another of the plurality of relay servers,
wherein TCP/IP connections are authenticated by comparing the login demand with connection information, and
wherein the one relay server relays the communication with the other network device via at least one other relay server of the plurality of relay servers based on the connection demand from the one network device.

5. The communication system according to claim 4 wherein each of the plurality of relay servers obtains connection information of each of the plurality of network devices, each of the plurality of network devices is connected to and capable of communicating with each of the plurality of relay servers, and each of the plurality of relay servers decides which relay server communication is relayed.

6. A relay server comprising:
communicating means for communicating with a plurality of network devices using TCP/IP connections that are established and held in response to authenticated login demands from the plurality of network devices, and for communicating with a different relay server; and
connection information holding means for holding connection information of the plurality of network devices which are capable of communicating,
wherein TCP/IP connections are authenticated by comparing the login demand with the connection information stored in the connection information holding means, and
wherein the communicating means renews the connection information within the connection information holding means based on renewal notification of connection information from the different relay server.

7. A communication system comprising:
a plurality of network devices; and
a plurality of relay servers connected to the plurality of network devices by a network,
wherein one of the plurality of network devices logs into and establishes an authenticated held TCP/IP connection with one of the plurality of relay servers and carries out communication by performing a connection demand with another one of the plurality of network devices that has logged into and established an authenticated held TCP/IP connection with another of the plurality of relay servers,
wherein TCP/IP connections are authenticated by comparing the login demand with connection information, and
wherein the one relay server holds the connection information of the plurality of network devices which are capable of communicating, renews the connection information based on the connection demand, notifies the renewed connection information to different relay servers of the plurality of relay servers, and renews the connection information based on renewal notification of connection information transmitted from the different relay servers.

8. A communication system comprising:
a plurality of network devices; and
a plurality of relay servers connected to the plurality of network devices by a network,
a data base server for holding connection information of the plurality of network devices and providing the connection information to the plurality of relay servers,
wherein one of the plurality of network devices logs into and establishes an authenticated held TCP/IP connection with one of the plurality of relay servers, and carries out communication by performing a connection demand with another one of the plurality of network devices that has logged into and established an authenticated held TCP/IP connection with another of the plurality of relay servers,
wherein TCP/IP connections are authenticated by comparing the login demand and with the connection information, and
wherein the one relay server renews the connection information based on the connection demand from the one network device, the one relay server causes the data base server to hold the renewed connection information.

9. A facsimile system comprising:
a facsimile machine connected to an inner network;
a gateway device for connecting the inner network to an outer network; and
a plurality of facsimile relay servers connected to the outer network,
wherein the facsimile machine logs in and establishes a held TCP/IP connection with one of the plurality of facsimile relay servers in advance via the gateway device, and then transmits or receives an image over the held connection, and
the one facsimile relay server relays communication or the image between the gateway device and another facsimile machine in another inner network that has logged into and established a held TCP/IP connection with another facsimile relay server by carrying out the communication with one or a plurality of the gateway devices and one or a plurality of different facsimile relay servers.

10. The facsimile system according to claim 9 wherein the one relay server manages the facsimile machine to be connected thereto in accordance with identifying information specific to the facsimile machine.

11. The facsimile system according to claim 9 wherein a plurality of facsimile machines within the inner network and another inner network can be connected to the one relay server via the gateway device and the another gateway device, and the one relay server manages each of the plurality of facsimile machines to be connected thereto in accordance with identifying information specific to each of the plurality of facsimile machines.

12. A method for communicating between a plurality of network devices and a plurality of relay servers comprising:
establishing and holding an authenticated TCP/IP connection between each of a plurality of network devices and a plurality of relay servers at the initiative of the network devices;
authenticating the TCP/IP connection by comparing a login demand with connection information; and
relaying a communication between one of the plurality network devices and another one of the plurality of network devices by one of the plurality of relay servers via an authenticated held TCP/IP connection between the one network device and the one relay server, at least one other relay server of the plurality of relay servers, and an authenticated held TCP/IP connection between another relay server and the another network device based on a connection demand to the another network device from the one network device.

13. The communication method according to claim 12 further comprising obtaining connection information of the plurality of network devices established with the communication path to each of the plurality of relay servers, and deciding which of the other relay servers communication is relayed.

14. The communication method according to claim 12, further comprising holding the connection information of the plurality of network devices established with the communication path and notifying the connection information to the another relay server, and renewing the connection information based on the notification from the another relay server.

15. A method for a relay server to communicate between a plurality of network devices and a plurality of relay servers comprising:
establishing and holding an authenticated TCP/IP connection with one of the plurality of network devices based on a connection demand from the one of the plurality of the network devices;
authenticating the TCP/IP connection by comparing the connection demand with connection information; and
relaying the communication between the one of the plurality of network devices and another one of the plurality network devices via an authenticated held TCP/IP connection between the one network device and the relay server, at least one other relay server of the plurality of relay servers, and an authenticated held TCP/IP connection between another relay server and the another network device based on the connection demand to the another network device from the one network device.

16. The communication method according to claim 15 further comprising:
obtaining the connection information of the plurality of network devices established with the communication path to the another relay server, and
deciding which of the plurality of relay servers to relay.

17. The communication method according to claim 15, comprising:
holding the connection information of the plurality of network devices established with the communication path;
notifying the connection information the another relay server; and
renewing the connection information based on the notification from the another relay server.

18. A relay server comprising:
a communicating device communicating with a plurality of network devices using TCP/IP connections that are established and held in response to authenticated login demands from the plurality of network devices, and for communicating with a different relay server; and
a connection information holding device holding connection information of the plurality of network devices capable of communicating by the communicating device;
wherein TCP/IP connections are authenticated by comparing the login demand with the connection information stored in the connection information holding device, and
wherein the communicating device refers to the connection information based on a connection demand from one of the plurality of network devices having a held TCP/IP connection with the relay server, and relays communication via the different relay server to another one of the plurality of network devices having a held TCP/IP connection with the different relay server.

19. The relay server according to claim 18 wherein the communicating device receives the connection information the different relay server holds and stores the connection information in the connection information holding device.

20. The relay server according to claim 18 wherein each of the plurality of relay servers obtains connection information of each of the plurality of network devices, each of the plurality of network devices is connected to and capable of communicating with the each of the plurality of relay servers, and each of the plurality of relay servers decides which relay server communication is relayed.

21. A relay server comprising:
communicating means for communicating with a plurality of network devices using TCP/IP connections that are established and held in response to authenticated login demands from the plurality of network devices, and for communicating with a different relay server; and
connection information holding means for holding connection information of the network devices which are capable of communicating,
wherein TCP/IP connections are authenticated by comparing the login demand with the connection information stored in the connection information holding means, and
wherein the communicating means renews the connection information based on a demand from one of the plurality of network devices, and notifies the renewed connection information to the different relay server based on renewal of the connection information.

* * * * *